(12) United States Patent
Miller et al.

(10) Patent No.: US 6,834,073 B1
(45) Date of Patent: Dec. 21, 2004

(54) SYSTEM AND METHOD FOR BASEBAND REMOVAL OF NARROWBAND INTERFERENCE IN ULTRA WIDEBAND SIGNALS

(75) Inventors: Timothy R. Miller, Washington, DC (US); John W. McCorkle, Laurel, MD (US)

(73) Assignee: Freescale Semiconductor, Inc., Austin, TX (US)

( * ) Notice: Subject to any disclaimer, the term of this patent is extended or adjusted under 35 U.S.C. 154(b) by 731 days.

(21) Appl. No.: 09/685,203

(22) Filed: Oct. 10, 2000

Related U.S. Application Data

(60) Provisional application No. 60/207,225, filed on May 26, 2000, and provisional application No. 60/217,099, filed on Jul. 10, 2000.

(51) Int. Cl.⁷ .............................. H04B 1/69; H03D 1/04
(52) U.S. Cl. ....................................... 375/130; 375/346
(58) Field of Search ................................. 375/130, 140, 375/146, 131, 295, 147, 149, 346; 370/324, 213

(56) References Cited

U.S. PATENT DOCUMENTS

| | | | |
|---|---|---|---|
| 2,671,896 A | 3/1954 | deRosa | |
| 3,666,316 A | 5/1972 | Robbins | |
| 3,806,795 A | 4/1974 | Morey | |
| 5,337,054 A | 8/1994 | Ross et al. | |
| 5,677,927 A | 10/1997 | Fullerton et al. | |
| 6,351,246 B1 | 2/2002 | McCorkle | |
| 6,700,939 B1 * | 3/2004 | McCorkle et al. | 375/295 |
| 6,735,238 B1 | 5/2004 | McCorkle | |
| 2003/0151411 A1 * | 8/2003 | McCorkle et al. | 375/295 |

OTHER PUBLICATIONS

Richard Comerford, IEEE Spectrum, pp. 35–41, "Handhelds Duke it Out for the Internet", Aug. 2000.
T. Miller, et al., IEEE Transactions on Aerospace and Electronic Systems, vol. 33, No. 4, pp. 1142–1156, "RFI Suppression for Ultra Widerband Radar", Oct. 1, 1997.
X. Huang, et al., Electronics Letters, vol. 35, No. 22, pp. 1916–1917, "Gradual Relax Algorithm for RFI Suppression in UWB–SAR", Oct. 28, 1999.
B. Juhel, et al., Ultra–Wideband, Short–Pulse Electromagnetics 4, pp. 387–393, "Radio Frequency Interferences Suppression for Noisy Ultra Wide Band SAR Measurements", Jun. 14–19, 1998.
U.S. patent application Ser. No. 09/633,815, filed Aug. 7, 2000, McCorkle.
U.S. patent application Ser. No. 60/207,225, filed May 26, 2000, McCorkle.
U.S. patent application Ser. No. 09/685,198, filed Oct. 10, 2000, McCorkle.
U.S. patent application Ser. No. 60/238,466, filed Oct. 10, 2000, McCorkle.
U.S. patent application Ser. No. 60/217,099, filed Jul. 10, 2000, Miller.
U.S. patent application Ser. No. 09/685,197, filed Oct. 10, 2000, Miller.
U.S. patent application Ser. No. 09/685,195, filed Oct. 10, 2000, Miller.

(List continued on next page.)

*Primary Examiner*—Khai Tran
(74) *Attorney, Agent, or Firm*—Posz & Bethards, PLC

(57) ABSTRACT

A system, method, and computer program product for baseband removal of narrowband interference contained within UWB signals in a UWB receiver. The RFI is extracted from the UWB signal by employing a filter that is matched approximately with the RFI in the baseband signal, extracting RFI, and passing the desired data signal unscathed.

35 Claims, 16 Drawing Sheets

OTHER PUBLICATIONS

U.S. patent application Ser. No. 09/684,401, filed Oct. 10, 2000, Miller.
U.S. patent application Ser. No. 09/685,196, filed Oct. 10, 2000, Miller.
U.S. patent application Ser. No. 09/685,199, filed Oct. 10, 2000, Miller.
U.S. patent application Ser. No. 09/685,202, filed Oct. 10, 2000, Rofheart.
U.S. patent application Ser. No. 09/685,205, filed Oct. 10, 2000, McCorkle.
U.S. patent application Ser. No. 09/684,172, filed Oct. 10, 2000, McCorkle.

* cited by examiner

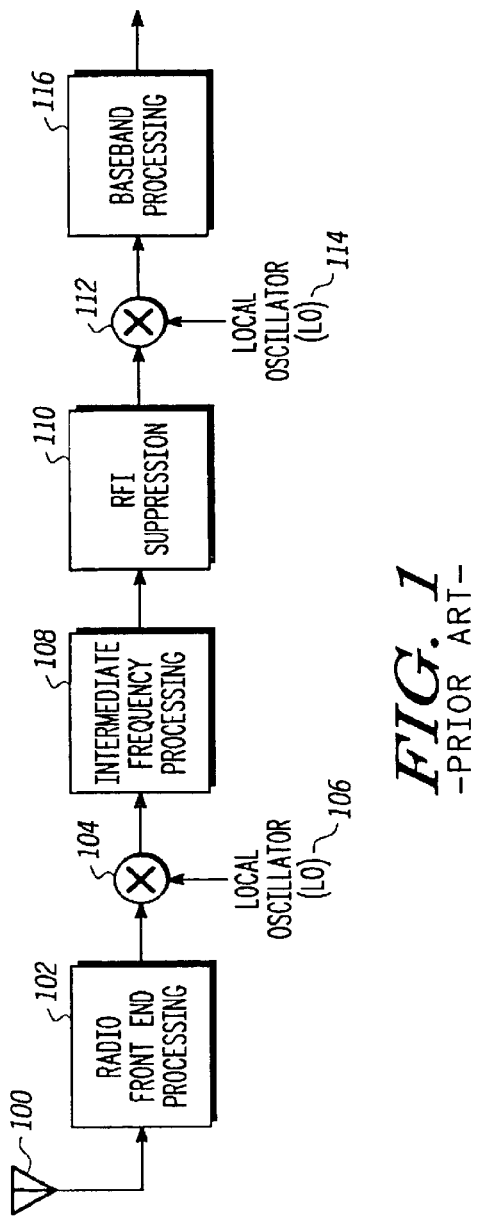
FIG. 1 -PRIOR ART-
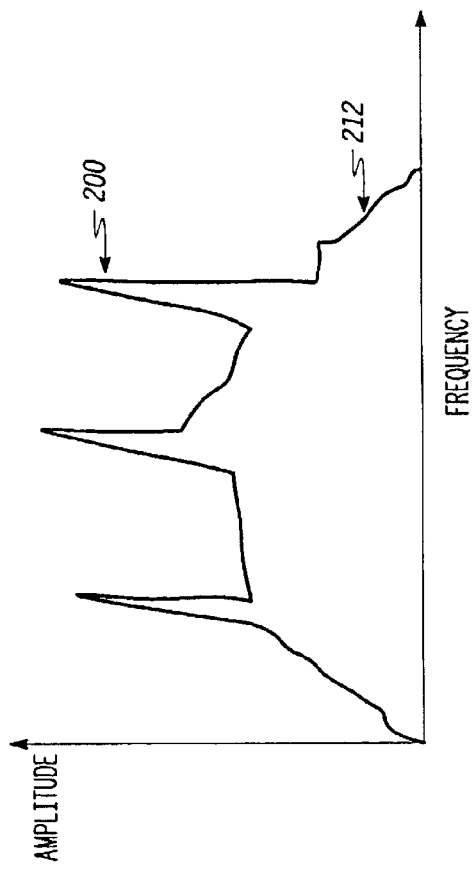
FIG. 2

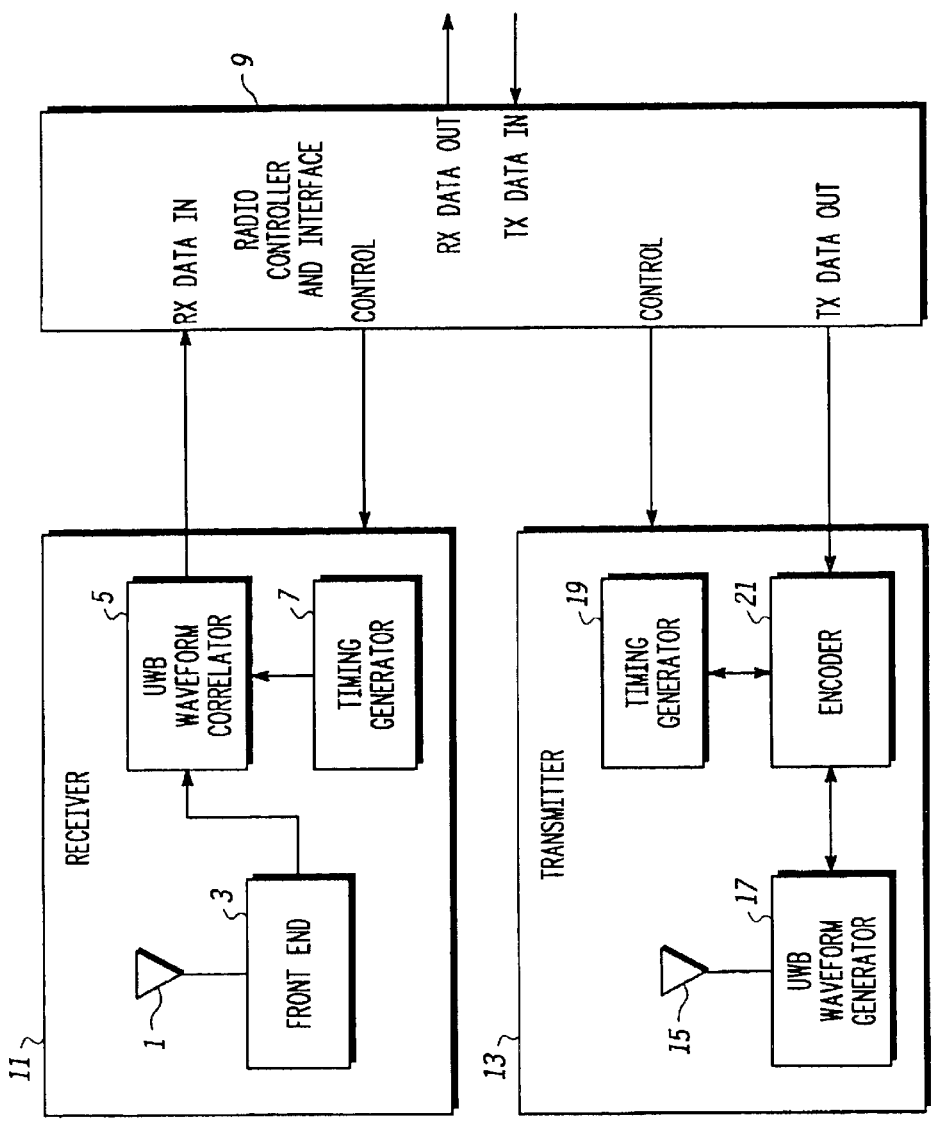
FIG. 3A(1)

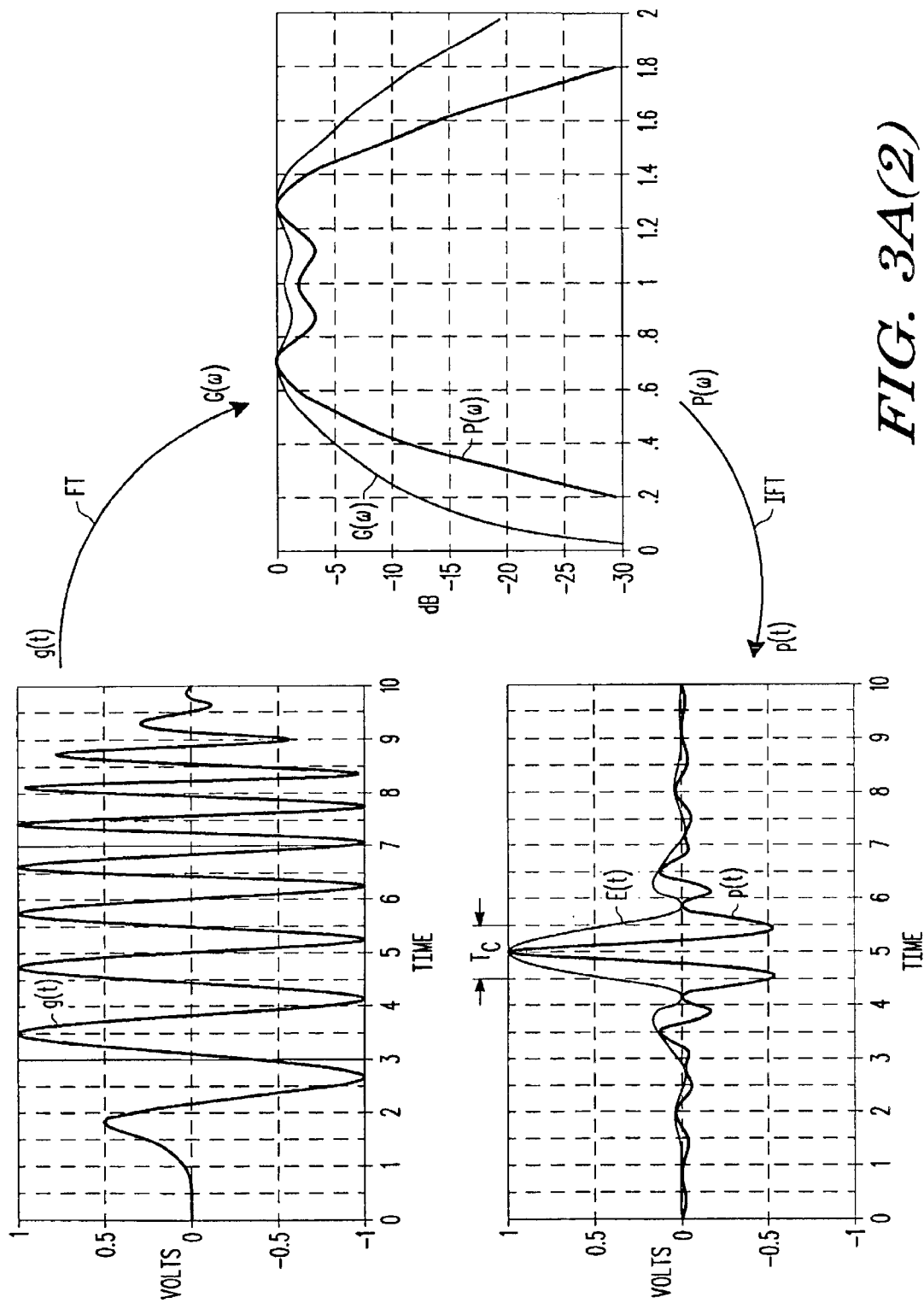
FIG. 3A(2)

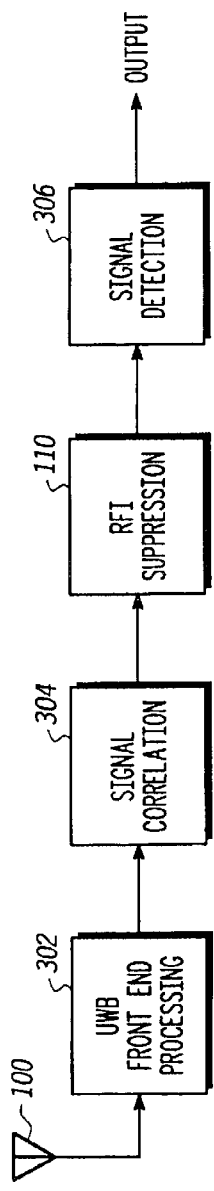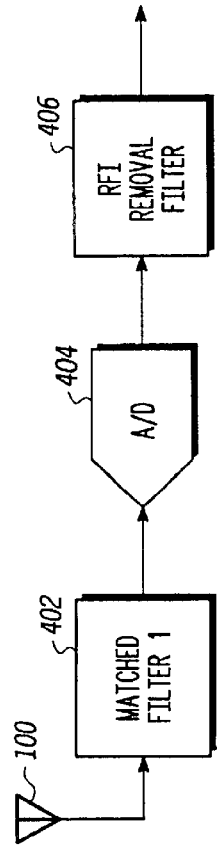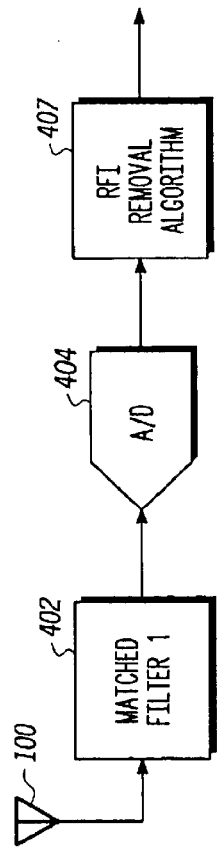

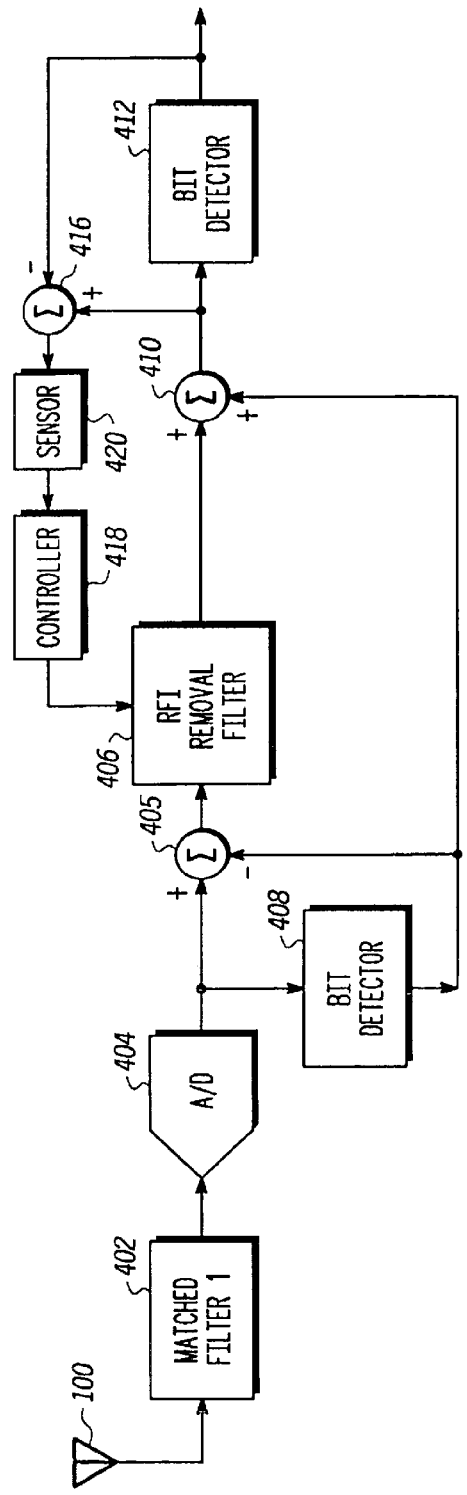
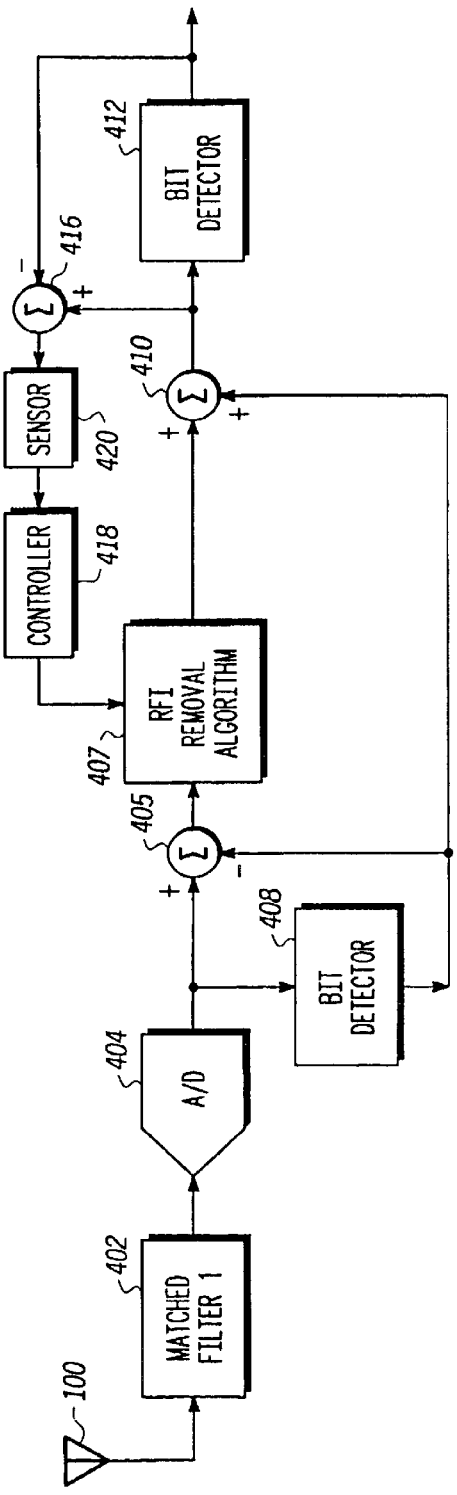
FIG. 8A
FIG. 8B

SYSTEM AND METHOD FOR BASEBAND REMOVAL OF NARROWBAND INTERFERENCE IN ULTRA WIDEBAND SIGNALS

CROSS-REFERENCE TO RELATED PATENT DOCUMENTS

This application claims benefit of priority to U.S. Provisional Application Nos. 60/207,225 and 60/217,099 filed in the United States Patent and Trademark Office on May 26, 2000, and Jul. 10, 2000, respectively. The present document contains subject matter related to that disclosed in commonly owned, application Ser. No. 09/209,460 filed Dec. 11, 1998, entitled ULTRA WIDE BANDWIDTH SPREAD-SPECTRUM COMMUNICATIONS SYSTEM, issued as U.S. Pat. No. 6,700,939; Ser. No. 09/633,815 filed Aug. 7, 2000, entitled ELECTRICALLY SMALL PLANAR UWB ANTENNA; application Ser. No. 09/563,292 filed May 3, 2000, entitled PLANAR ULTRA WIDE BAND ANTENNA WITH INTEGRATED ELECTRONICS, issued as U.S. Pat. No. 6,351,246; Application Ser. No. 60/207,225 filed May 26, 2000, entitled ULTRA WIDEBAND COMMUNICATION SYSTEM AND METHOD; application Ser. No. 09/685,198, filed Oct. 10, 2000, entitled ANALOG SIGNAL SEPARATOR FOR UWB VERSUS NARROWBAND SIGNALS; Application Ser. No. 60/238,466, filed Oct. 10, 2000, entitled ULTRA WIDE BANDWIDTH NOISE CANCELLATION MECHANISM AND METHOD; Application Ser. No. 60/217,099 filed Jul. 10, 2000, entitled MULTIMEDIA WIRELESS PERSONAL AREA NETWORK (WPAN) PHYSICAL LAYER SYSTEM AND METHOD; application Ser. No. 09/685,197, filed Oct. 10, 2000, entitled MODE CONTROLLER FOR SIGNAL ACQUISITION AND TRACKING IN AN ULTRA WIDEBAND COMMUNICATION SYSTEM; application Ser. No. 09/684,400, filed Oct. 10, 2000, entitled ULTRA WIDEBAND COMMUNICATION SYSTEM, METHOD, AND DEVICE WITH LOW NOISE PULSE FORMATION, issued as U.S. Pat. No. 6,735,238; application Ser. No. 09/685,195, filed Oct. 10, 2000, entitled ULTRA WIDE BANDWIDTH SYSTEM AND METHOD FOR FAST SYNCHRONIZATION; application Ser. No. 09/684,401, filed Oct. 10, 2000, entitled ULTRA WIDE BANDWIDTH SYSTEM AND METHOD FOR FAST SYNCHRONIZATION USING SUB CODE SPINS; application Ser. No. 09/685,196, filed Oct. 10, 2000, entitled ULTRA WIDE BANDWIDTH SYSTEM AND METHOD FOR FAST SYNCHRONIZATION USING MULTIPLE DETECTION ARMS; application Ser. No. 09/685,199, filed Oct. 10, 2000, entitled A LOW POWER, HIGH RESOLUTION TIMING GENERATOR FOR ULTRA-WIDE BANDWIDTH COMMUNICATION SYSTEMS; application Ser. No. 09/685,202, filed Oct. 10, 2000, entitled METHOD AND SYSTEM FOR ENABLING DEVICE FUNCTIONS BASED ON DISTANCE INFORMATION; application Ser. No. 09/685,201, filed Oct. 10, 2000, entitled CARRIERLESS ULTRA WIDEBAND WIRELESS SIGNALS FOR CONVEYING APPLICATION DATA, issued as U.S. Pat. No. 6,505,032; application Ser. No. 09/685,205, filed Oct. 10, 2000, entitled SYSTEM AND METHOD FOR GENERATING ULTRA WIDE-BAND PULSES; application Ser. No. 09/684,782, filed Oct. 10, 2000, entitled ULTRA WIDEBAND COMMUNICATION SYSTEM, METHOD, AND DEVICE WITH LOW NOISE RECEPTION; and application Ser. No. 09/685,200, filed Oct. 10, 2000, entitled LEAKAGE NULLING RECEIVER CORRELATOR STRUCTURE AND METHOD FOR ULTRA WIDE BANDWIDTH COMMUNICATION SYSTEM, the entire contents of each of which being incorporated herein by reference.

BACKGROUND OF THE INVENTION

1. Field of the Invention

The present invention relates to radio frequency communication receivers, systems and methods employing ultra wide band (UWB) signaling techniques. More particularly, the present invention relates to systems, methods and computer program product configured to remove in a UWB receiver "narrowband" interference from a UWB signal.

2. Description of the Background

Wireless communication systems operate on the principle of using a transmitter that is configured to take data and send the data to an amplifier and antenna, which converts the data from electrical signals into electromagnetic radiation. This electromagnetic radiation propagates through the air, or other medium, and is converted from electromagnetic radiation back into an electric current (or voltage) by a receive antenna coupled to a receiver. The electrical signals coupled into the receive antenna are typically very small and therefore are usually amplified before being sent to a detector for converting the electrical signals into digital information (or the type of format employed by the source signal).

Accordingly, the receiver converts the energy that is passed from the antenna into an electrical form and then isolates the useful information contained within the energy coupled from the antenna to produce a useful output representative of the input signal. A problem arises if an unintended signal, particularly a strong signal, is coupled into the antenna at the same time as the desired signal. In this case, the unintended signal, if it overlaps in frequency with the intended signal, will tend to "jam" the reception of the intended signal, thereby reducing reception quality. Furthermore, even if the unintended signal is not coincident in frequency with the desired signal, the unintended signal may nonetheless drive a low noise amplifier (LNA) into a saturation mode, thereby creating unwanted high spurious signals. When this LNA is saturated, the amount of gain imparted by the LNA is reduced and the LNA creates intermodulation products and harmonics, which degrade the reception of the intended signal.

In narrowband communication systems one technique for avoiding the saturation of a front end amplifier by radio frequency interference (RFI) is to design the radio front end with a transfer function that is matched to the desired signal and has a bandpass characteristic centered around the intended signal, but excluding the unintended radio frequency interference (RFI). However, such techniques are not suitable if the intended signal is spectrally broader (but still not UWB), such as in a conventional spread spectrum system, much like a CDMA system or other direct sequence spread spectrum system, or even a frequency hopping system. It is worth mentioning that conventional "wideband" spread spectrum signals are still relatively "narrowband" with respect to UWB signals.

Another way that a receiver front end can deal with relatively large "in band" interferers is to employ automatic gain control (AGC), so that the amount of gain in the amplifier coupled to the antenna is reduced if exposed to relatively large signal levels from either intended or unintended RFI. However, the problem arises that the unintended RFI may be sufficiently high such that the desired signal is suppressed to a level beneath the dynamic range of the low noise amplifier (LNA) or of the subsequent processing circuitry. In this case it is said that the instantaneous dynamic range of the radio front end is less than the ratio of RFI to intended signal strength.

Another technique for dealing with in-band RFI in broadband communication systems is to first detect and then suppress unintended RFI. However, such systems usually require detection of the interfering signal to distinguish an interferer from an intended signal and special cancellation circuitry dedicated to the function of "notching" or uniquely suppressing the unintended RFI. Inserting notch filters into the passband creates not only detrimental insertion loss, thus increasing the noise for the radio front end, but also introduces phase distortion into the received signal thus limiting the effectiveness of such systems. Furthermore, such systems are usually not adaptive because it is difficult and expensive to adjust the center band of notch filters based on the particular interfering signal at any given time.

Spread spectrum communication systems have a predetermined amount of "processing gain" which relates to the amount of redundancy in a transmitted signal. In direct sequence spread spectrum communication systems, this amount of redundancy materializes in the form of a much broader bandwidth used to communicate the signal than is necessary if simply the information itself were transmitted (in a "narrowband" modulation format). Accordingly, the receiver, when applying the spreading code to the received signal so as to "despread" the signal also applies the spreading code to the interference, but because the interference does not coherently combine with the spreading code, the interference is reduced in power and the spread signal is despread by the amount equal to the processing gain. More detailed descriptions of spreading techniques and systems for employing spread spectrum communications is described in "Spread Spectrum Design LPE and AJ Systems", by David L. Nicholson, Computer Science Press, 1987, ISBN0-88175-102-2, the entire contents of which being incorporated herein by reference.

FIG. 1 is a block diagram of a conventional receiver. The receive antenna 100 converts an incoming wireless radio frequency signal into an electrical signal. The bandwidth and passband of the radio front end circuit 102 is matched to the incoming signal so as to extract the desired signal from out-of-band noise. The receiver also includes mixer 104 and local oscillator 106. The output of mixer 104 is an intermediate frequency (IF) signal. The intermediate frequency detector 108 amplifies and band-pass filters the IF signal and outputs it to the RFI suppressor 110 which helps to notch RFI from the signal. In spread spectrum signals, the RFI is easily isolated and extracted because its energy is concentrated out-of band or in a small spectrum range. Next are a second mixer 112 and local oscillator 114, which provide a baseband signal to a baseband processor 116.

Conventional UWB communication systems transmit energy over a much larger bandwidth than normal "narrowband" or even spread-spectrum communication systems. Accordingly, it would be expected that the number of narrowband signals to be encountered by such UWB systems would be relatively high. Examples of such UWB systems include deRosa (U.S. Pat. No. 2,671,896), Robbins (U.S. Pat. No. 3,662,316), Morey (U.S. Pat. No. 3,806,795), Ross and Mara (U.S. Pat. No. 5,337,054) and Fullerton and Kowie (U.S. Pat. No. 5,6777,927).

In a conventional receiver, RFI suppression is done prior to baseband processing, as shown in FIG. 1. However, as recognized by the present inventors this is particularly difficult when there are multiple RFI signals present, and the power spectral density of the UWB signal is so low with respect to the RFI as is the case with UWB systems.

The best papers known to the inventors on UWB RFI extraction have been for radar applications. Examples are: T. R. Miller, J. W. McCorkle, and L. C. Potter, "RFI Suppression for Ultra-Wideband Radar", IEEEE Transaction on Aerospace and Electronics Systems, vol. 33, no. 4, October 1997, herein incorporated by reference, and the group of papers in Algorithms for Synthetic Aperture Radar Imagery II, D. A. Giglio (ed.), SPIE Vol. 2487, Orlando Fla., April 1995, herein incorporated by reference. These approaches could not be used for an inexpensive and low power communication system because the sample rates used were high enough to capture the spectrum of the radar without aliasing, and the processing was done on bursts of data (i.e. in a radar mode where a burst covered a certain segment of range) not continuously as is the case with a communications system. Indeed, banks of the highest speed digital signal processing available had to be used in order to process the radar signals.

The challenge, as presently recognized, is to correctly receive an intended, transmitted UWB signal at the UWB receiver in the presence of narrowband interference signals in a post-correlation portion of the receiver circuitry where the processing load is small enough to be done in an inexpensive and low power communication system.

SUMMARY OF THE INVENTION

Consistent with the title of this section, only a brief description of selected features of the present invention is presented. A more complete description of the present invention is the subject of this entire document.

An object of the present invention is to provide a UWB receiver that includes an RFI extraction mechanism that suppresses at baseband, unwanted in-band RFI without adversely affecting the reception of the intended UWB signal.

Another object of the present invention is to provide a UWB receiver that includes an RFI extraction mechanism that estimates, in the baseband signal after correlation, the intended UWB signal.

Another object of the present invention is to provide a UWB receiver that includes an adaptable RFI extraction mechanism, as well as a method and computer program product, for extracting the RFI in the baseband signal after correlation.

Another object of the present invention is to provide a UWB receiver that passes UWB signals, but suppresses carrier-based modulated signals (i.e. narrowband signals).

Another feature of the present invention is to address the above-identified and other deficiencies of conventional communication systems and methods.

These and other objects are accomplished by way of a UWB receiver that employs a matched filter correlator, an analog to digital (A/D) converter that samples the UWB signal after correlation and an RFI extraction mechanism to identify the RFI signal after the correlation process and remove the RFI.

While several embodiments are disclosed herein, one embodiment would include an RFI removal filter after the A/D converter that passes the desired data signal, but cancels an RFI signal. Another embodiment would include an RFI removal filter and a bit detector after the A/D converter to cancel the RFI signal and extract the transmitted information. Another embodiment would include the same RFI removal filter and bit detector along with an RFI estimator for adapting the filter to cancel observed RFI.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram of a conventional receiver;

FIG. 2 is a spectral plot of a UWB signal with noise and RFI tones riding thereon;

FIG. 3A(1) is a block diagram of an ultra-wide band (UWB) transceiver, according to the present invention;

FIG. 3A(2) is a diagram for illustrating the operation of the transceiver of FIG. 3A(1), according to the present invention;

FIG. 3C is a block diagram of a UWB receiver with an RFI extraction mechanism according to the present invention;

FIG. 3D is a block diagram of one embodiment of a UWB receiver with a basic filter for RFI extraction;

FIG. 3E is a block diagram of one embodiment of a UWB receiver that employs an RFI extraction algorithm;

FIGS. 8A-8B are block diagrams of embodiments of a UWB receiver with a controller as part of the RFI extraction mechanism;

DETAILED DESCRIPTION OF THE PREFERRED EMBODIMENTS

Figure 3B:
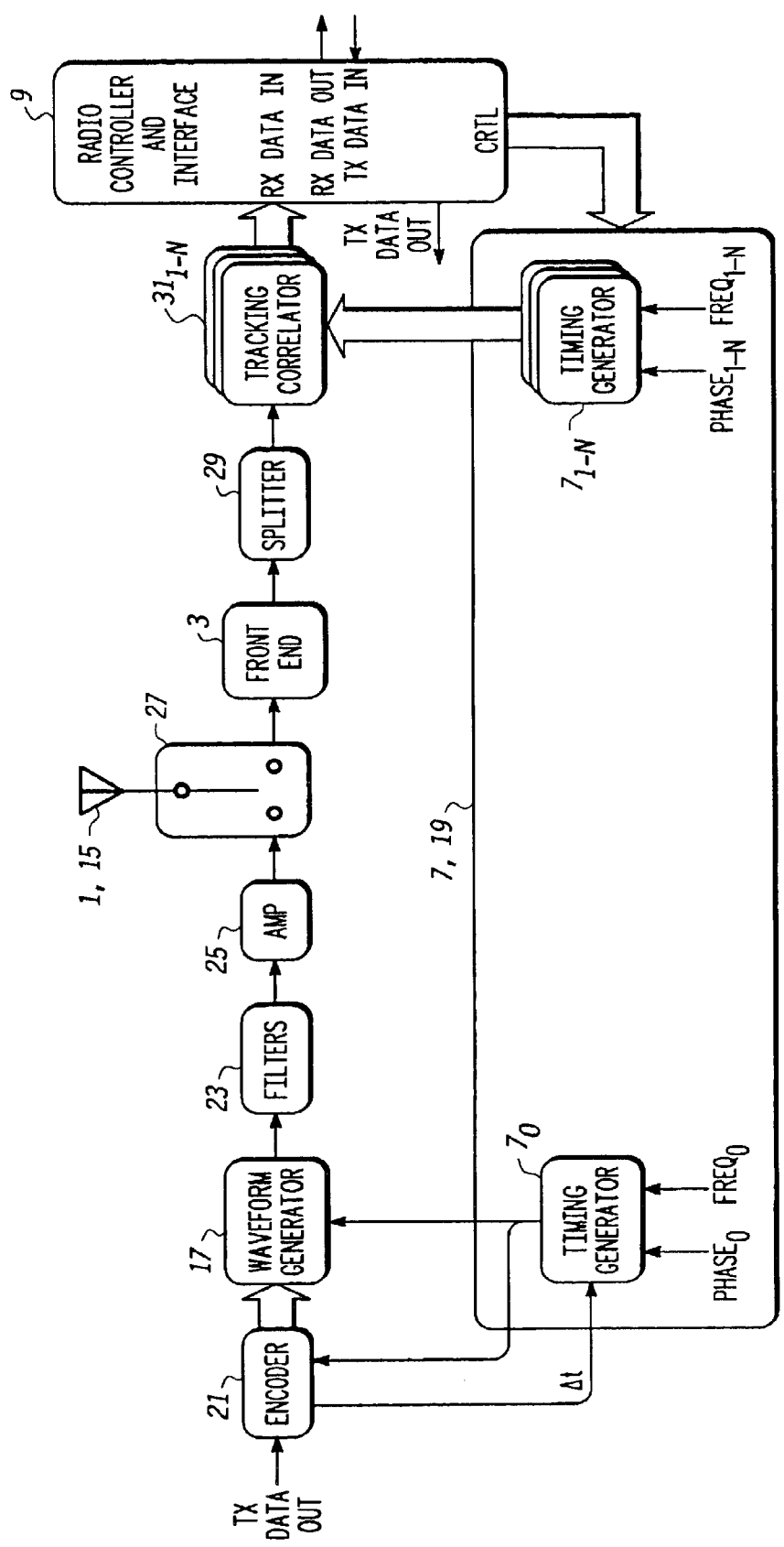
FIG. 3B is a block diagram of the transceiver of FIG. 3A(1), that manipulates a shape of UWB pulses, according to the present invention.

Referring now to the drawings, FIG. 2 shows the spectrum of the receive signal detected at the antenna of the UWB receiver. The incoming signal is contaminated with RFI tones 200 (or narrowband signals) and noise 212. The white noise 212 and RFI tones 200 are combined with the intended UWB signal. As FIG. 2 shows, the RFI tones are typically multiple in number and distributed in frequency throughout the UWB signal band. FIG. 2 also shows the omni-present additive Gaussian white noise that is distributed throughout the UWB band.

FIG. 3A(1) is a block diagram of an ultra-wide band (UWB) transceiver. In FIG. 3A(1), the transceiver includes three major components, namely, receiver 11, radio controller and interface 9, and transmitter 13. Alternatively, the system may be implemented as a separate receiver 11 and radio controller and interface 9, and a separate transmitter 13 and radio controller and interface 9. The radio controller and interface 9 serves as a media access control (MAC) interface between the UWB wireless communication functions implemented by the receiver 11 and transmitter 13 and applications that use the UWB communications channel for exchanging data with remote devices.

The receiver 11 includes an antenna 1 that converts a UWB electromagnetic waveform into an electrical signal (or optical signal) for subsequent processing. The UWB signal is generated with a sequence of shape-modulated wavelets, where the occurrence times of the shape-modulated wavelets may also be modulated. For analog modulation, at least one of the shape control parameters is modulated with the analog signal. More typically, the wavelets take on M possible shapes. Digital information is encoded to use one or a combination of the M wavelet shapes and occurrence times to communicate information.

In one embodiment of the present invention, each wavelet communicates one bit, for example, using two shapes such as bi-phase. In other embodiments of the present invention, each wavelet may be configured to communicate nn bits, where $M \geq 2^{nn}$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1, +a1, −a1, +a2, −a2, . . . , +aN, −aN), (iii) quadrature phase signals (+1, −1, +j, −j), (iv) multi-phase signals (1, −1, $\exp(+j\pi/N)$, $\exp(-j\pi/N)$, $\exp(+j\pi 2/N)$, $\exp(-j\pi 2/N)$, . . . , $\exp(+j(N-1)/N)$, $\exp(-j\pi(N-1)/N)$), (v) multilevel multi-phase signals ($a_i \exp(j2\pi\beta/N)$ $|a_i\epsilon\{1, a1, a2, \ldots, aK\}, \beta\epsilon\{0, 1, \ldots, N-1\}$), (vi) frequency modulated pulses, (vii) pulse position modulation (PPM) signals (possibly same shape pulse transmitted in different candidate time slots), (viii) M-ary modulated waveforms $g_{B_i}(t)$ with $B_i\epsilon\{1, \ldots, M\}$, and (ix) any combination of the above waveforms, such as multi-phase channel symbols transmitted according to a chirping signaling scheme. The present invention, however, is applicable to variations of the above modulation schemes and other modulation schemes (e.g., as described in Lathi, "Modern Digital and Analog Communications Systems," Holt, Rinehart and Winston, 1998, the entire contents of which is incorporated by reference herein), as will be appreciated by those skilled in the relevant art(s).

Some exemplary waveforms and characteristic equations thereof will now be described. The time modulation component, for example, can be defined as follows. Let $t_i$ be the time spacing between the $(i-1)^{th}$ pulse and the $i^{th}$ pulse. Accordingly, the total time to the $i^{th}$ pulse is $$T_i = \sum_{j=0}^{i} t_j.$$

The signal $T_i$ could be encoded for data, part of a spreading code or user code, or some combination thereof. For example, the signal $T_i$ could be equally spaced, or part of a spreading code, where $T_i$ corresponds to the zero-crossings of a chirp, i.e., the sequence of $T_i$'s, and where $$T_i = \sqrt{\frac{i-a}{k}}$$

for a predetermined set of a and k. Here, a and k may also be chosen from a finite set based on the user code or encoded data.

An embodiment of the present invention can be described using M-ary modulation. Equation 1 below can be used to represent a sequence of exemplary transmitted or received pulses, where each pulse is a shape modulated UWB wavelet, $g_{B_i}(t-T_i)$.

$$x(t) = \sum_{i=0}^{\infty} g_{B_i}(t - T_i) \tag{1}$$

In the above equation, the subscript i refers to the $i^{th}$ pulse in the sequence of UWB pulses transmitted or received. The wavelet function g has M possible shapes, and therefore $B_i$ represents a mapping from the data, to one of the M-ary modulation shapes at the $i^{th}$ pulse in the sequence. The wavelet generator hardware (e.g., the UWB waveform generator 17) has several control lines (e.g., coming from the radio controller and interface 9) that govern the shape of the wavelet. Therefore, $B_i$ can be thought of as including a lookup-table for the M combinations of control signals that produce the M desired wavelet shapes. The encoder 21 combines the data stream and codes to generate the M-ary states. Demodulation occurs in the waveform correlator 5 and the radio controller and interface 9 to recover to the original data stream. Time position and wavelet shape are combined into the pulse sequence to convey information, implement user codes, etc.

In the above case, the signal is comprised of wavelets from i=1 to infinity. As i is incremented, a wavelet is produced. Equation 2 below can be used to represent a generic wavelet pulse function, whose shape can be changed from pulse to pulse to convey information or implement user codes, etc.

$$g_{B_i}(t) = Re(B_{i,1}) \cdot f_{B_{i,2}, B_{i,3}, \ldots}(t) + Im(B_{i,1}) \cdot h_{B_{i,2}, B_{i,3}, \ldots}(t) \tag{2}$$

In the above equation, function f defines a basic wavelet shape, and function h is simply the Hilbert transform of the function f. The parameter $B_{i,1}$ is a complex number allowing the magnitude and phase of each wavelet pulse to be adjusted, i.e., $B_{i,1} = a_I \angle \theta_i$, where $a_I$ is selected from a finite set of amplitudes and $\theta_i$ is selected from a finite set of phases. The parameters $\{B_{i,2}, B_{i,3}, \ldots\}$ represent a generic group of parameters that control the wavelet shape.

An exemplary waveform sequence x(t) can be based on a family of wavelet pulse shapes f that are derivatives of a Guassian waveform as defined by Equation 3 below.

$$f_{B_i}(t) = \Psi(B_{i,2}, B_{i,3}) \left( \frac{d^{B_{i,3}}}{dt^{B_{i,3}}} e^{-[B_{i,2}t]^2} \right) \tag{3}$$

In the above equation, the function $\Psi()$ normalizes the peak absolute value of $f_{B_i}(t)$ to 1. The parameter $B_{i,2}$ controls the pulse duration and center frequency. The parameter $B_{i,3}$ is the number of derivatives and controls the bandwidth and center frequency.

Another exemplary waveform sequence x(t) can be based on a family of wavelet pulse shapes f that are Gaussian weighted sinusoidal functions, as described by Equation 4 below.

$$f_{B_{i,2}, B_{i,3}, B_{i,4}} = f_{\omega_i, k_i, b_i}(t) = e^{-[b_i t]^2} \sin(\omega_i t + k_i t^2). \tag{4}$$

In the above equation, $b_i$ controls the pulse duration, $\omega_i$ controls the center frequency, and $k_i$ controls a chirp rate. Other exemplary weighting functions, beside Gaussian, that are also applicable to the present invention include, for example, Rectangular, Hanning, Hamming, Blackman-Harris, Nutall, Taylor, Kaiser, Chebychev, etc.

Another exemplary waveform sequence x(t) can be based on a family of wavelet pulse shapes f that are inverse-exponentially weighted sinusoidal functions, as described by Equation 5 below.

$$g_{B_i}(t) = \left( \frac{1}{e^{\frac{-(t-t1_i)}{.3 \tau_{r_i}}} + 1} - \frac{1}{e^{\frac{-(t-t2_i)}{.3 \tau_{f_i}}} + 1} \right) \cdot \sin(\theta_i + \omega_i t + k_i t^2) \tag{5}$$

where $\{B_{i,2}, B_{i,3}, B_{i,4}, B_{i,5}, B_{i,6}, B_{i,7}, B_{i,8}\} = \{t1_i, t2_i, t_{r_i}, t_{f_i}, \theta_i, \omega_i, k_i\}$ In the above equation, the leading edge turn on time is controlled by t1, and the turn-on rate is controlled by tr. The trailing edge turn-off time is controlled by t2, and the turn-off rate is controlled by tf. Assuming the chirp starts at t=0 and $T_D$ is the pulse duration, the starting phase is controlled by $\theta$, the starting frequency is controlled by $\omega$, the chirp rate is controlled by k, and the stopping frequency is controlled by $\omega + kT_D$. An example assignment of parameter values is $\omega=1$, tr=tf=0.25, t1=tr/0.51, and t2=$T_D$-tr/9.

A feature of the present invention is that the M-ary parameter set used to control the wavelet shape is chosen so as to make a UWB signal, wherein the center frequency $f_c$ and the bandwidth B of the power spectrum of g(t) satisfies $2f_c > B > 0.25f_c$. It should be noted that conventional equations define in-phase and quadrature signals (e.g., often referred to as I and Q) as sine and cosine terms. An important observation, however, is that this conventional definition is inadequate for UWB signals. The present invention recognizes that use of such conventional definition may lead to DC offset problems and inferior performance.

Furthermore, such inadequacies get progressively worse as the bandwidth moves away from $0.25f_c$ and toward $2f_c$. A key attribute of the exemplary wavelets (or e.g., those described in co-pending U.S. patent application Ser. No. 09/209,460 is that the parameters are chosen such that neither f nor h in Equation 2 above has a DC component, yet f and h exhibit the required wide relative bandwidth for UWB systems.

Similarly, as a result of $B > 0.25f_c$, it should be noted that the matched filter output of the UWB signal is typically only a few cycles, or even a single cycle. For example, the parameter n in Equation 3 above may only take on low values (e.g., such as those described in co-pending U.S. patent application Ser. No. 09/209,460.

The compressed (i.e., coherent matched filtered) pulse width of a UWB wavelet will now be defined with reference to FIG. 3A(2). In FIG. 3A(2), the time domain version of the wavelet thus represents g(t) and the Fourier transform (FT) version is represented by G(ω). Accordingly, the matched filter is represented as G*(ω), the complex conjugate, so that the output of the matched filter is P(ω)=G(ω)·G*(ω). The output of the matched filter in the time domain is seen by performing an inverse Fourier transform (IFT) on P(ω) so as to obtain p(t), the compressed or matched filtered pulse. The width of the compressed pulse p(t) is defined by $T_C$, which is the time between the points on the envelope of the compressed pulse E(t) that are 6 dB below the peak thereof, as shown in FIG. 3A(2). The envelope waveform E(t) may be determined by Equation 6 below.

$$E(t) = \sqrt{(p(t))^2 + (p^H(t))^2} \quad (6)$$

where $p^H(t)$ is the Hilbert transform of p(t).

Accordingly, the above-noted parameterized waveforms are examples of UWB wavelet functions that can be controlled to communicate information with a large parameter space for making codes with good resulting autocorrelation and cross-correlation functions. For digital modulation, each of the parameters is chosen from a predetermined list according to an encoder that receives the digital data to be communicated. For analog modulation, at least one parameter is changed dynamically according to some function (e.g., proportionally) of the analog signal that is to be communicated.

Referring back to FIG. 3A(1), the electrical signals coupled in through the antenna 1 are passed to a radio front end 3. Depending on the type of waveform, the radio front end 3 processes the electric signals so that the level of the signal and spectral components of the signal are suitable for processing in the UWB waveform correlator 5. The UWB waveform correlator 5 correlates the incoming signal (e.g., as modified by any spectral shaping, such as a matched filtering, partially matched filtering, simply roll-off, etc., accomplished in front end 3) with different candidate signals generated by the receiver 11, so as to determine when the receiver 11 is synchronized with the received signal and to determine the data that was transmitted.

The timing generator 7 of the receiver 11 operates under control of the radio controller and interface 9 to provide a clock signal that is used in the correlation process performed in the UWB waveform correlator 5. Moreover, in the receiver 11, the UWB waveform correlator 5 correlates in time a particular pulse sequence produced at the receiver 11 with the receive pulse sequence that was coupled in through antenna 1 and modified by front end 3. When the two such sequences are aligned with one another, the UWB waveform correlator 5 provides high signal to noise ratio (SNR) data to the radio controller and interface 9 for subsequent processing. In some circumstances, the output of the UWB waveform correlator 5 is the data itself. In other circumstances, the UWB waveform correlator 5 simply provides an intermediate correlation result, which the radio controller and interface 9 uses to determine the data and determine when the receiver 11 is synchronized with the incoming signal.

In some embodiments of the present invention, when synchronization is not achieved (e.g., during a signal acquisition mode of operation), the radio controller and interface 9 provides a control signal to the receiver 11 to acquire synchronization. In this way, a sliding of a correlation window within the UWB waveform correlator 5 is possible by adjustment of the phase and frequency of the output of the timing generator 7 of the receiver 11 via a control signal from the radio controller and interface 9. The control signal causes the correlation window to slide until lock is achieved. The radio controller and interface 9 is a processor-based unit that is implemented either with hard wired logic, such as in one or more application specific integrated circuits (ASICs) or in one or more programmable processors.

Once synchronized, the receiver 11 provides data to an input port ("RX Data In") of the radio controller and interface 9. An external process, via an output port ("RX Data Out") of the radio controller and interface 9, may then use this data. The external process may be any one of a number of processes performed with data that is either received via the receiver 11 or is to be transmitted via the transmitter 13 to a remote receiver.

During a transmit mode of operation, the radio controller and interface 9 receives source data at an input port ("TX Data In") from an external source. The radio controller and interface 9 then applies the data to an encoder 21 of the transmitter 13 via an output port ("TX Data Out"). In addition, the radio controller and interface 9 provides control signals to the transmitter 13 for use in identifying the signaling sequence of UWB pulses. In some embodiments of the present invention, the receiver 11 and the transmitter 13 functions may use joint resources, such as a common timing generator and/or a common antenna, for example. The encoder 21 receives user coding information and data from the radio controller and interface 9 and preprocesses the data and coding so as to provide a timing input for the UWB waveform generator 17, which produces UWB pulses encoded in shape and/or time to convey the data to a remote location.

The encoder 21 produces the control signals necessary to generate the required modulation. For example, the encoder 21 may take a serial bit stream and encode it with a forward error correction (FEC) algorithm (e.g., such as a Reed Solomon code, a Golay code, a Hamming code, a Convolutional code, etc.). The encoder 21 may also interleave the data to guard against burst errors. The encoder 21 may also apply a whitening function to prevent long strings of "ones" or "zeros." The encoder 21 may also apply a user specific spectrum spreading function, such as generating a predetermined length chipping code that is sent as a group to represent a bit (e.g., inverted for a "one" bit and non-inverted for a "zero" bit, etc.). The encoder 21 may divide the serial bit stream into subsets in order to send multiple bits per wavelet or per chipping code, and generate a plurality of control signals in order to affect any combination of the modulation schemes as described above (and/or as described in Lathi).

The radio controller and interface 9 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a priori knowledge of the user ID in order to make sense of the data. For example, the ID may be used to apply a different amplitude signal (e.g., of amplitude "f") to a fast modulation control signal to be discussed with respect to FIG. 3B, as a way of impressing the encoding onto the signal.

The output from the encoder 21 is applied to a UWB waveform generator 17. The UWB waveform generator 17 produces a UWB pulse sequence of pulse shapes at pulse times according to the command signals it receives, which may be one of any number of different schemes. The output from the UWB generator 17 is then provided to an antenna 15, which then transmits the UWB energy to a receiver.

In one UWB modulation scheme, the data may be encoded by using the relative spacing of transmission pulses (e.g., PPM, chirp, etc.). In other UWB modulation schemes, the data may be encoded by exploiting the shape of the pulses as described above (and/or as described in Lathi). It should be noted that the present invention is able to combine time modulation (e.g., such as pulse position modulation, chirp, etc.) with other modulation schemes that manipulate the shape of the pulses.

There are numerous advantages to the above capability, such as communicating more than one data bit per symbol transmitted from the transmitter 13, etc. An often even more important quality, however, is the application of such technique to implement spread-spectrum, multi-user systems, which require multiple spreading codes (e.g., such as each with spike autocorrelation functions, and jointly with low peak cross-correlation functions, etc.).

In addition, combining timing, phase, frequency, and amplitude modulation adds extra degrees of freedom to the spreading code functions, allowing greater optimization of the cross-correlation and autocorrelation characteristics. As a result of the improved autocorrelation and cross-correlation characteristics, the system according to the present invention has improved capability, allowing many transceiver units to operate in close proximity without suffering from interference from one another.

FIG. 3B is a block diagram of a transceiver embodiment of the present invention in which the modulation scheme employed is able to manipulate the shape and time of the UWB pulses. In FIG. 3B, when receiving energy through the antenna 1, 15 (e.g., corresponding antennas 1 and 15 of FIG. 3A(1) the energy is coupled in to a transmit/receive (T/R) switch 27, which passes the energy to a radio front end 3. The radio front end 3 filters, extracts noise, and adjusts the amplitude of the signal before providing the same to a splitter 29. The splitter 29 divides the signal up into one of N different signals and applies the N different signals to different tracking correlators $31_1$–$31_N$. Each of the tracking correlators $31_1$–$31_N$ receives a clock input signal from a respective timing generator $7_1$–$7_N$ of a timing generator module 7, 19, as shown in FIG. 3B.

The timing generators $7_1$–$7_N$, for example, receive a phase and frequency adjustment signal, as shown in FIG. 3B, but may also receive a fast modulation signal or other control signal(s) as well. The radio controller and interface 9 provides the control signals, such as phase, frequency and fast modulation signals, etc., to the timing generator module 7, 19, for time synchronization and modulation control. The fast modulation control signal may be used to implement, for example, chirp waveforms, PPM waveforms, such as fast time scale PPM waveforms, etc.

The radio controller and interface 9 also provides control signals to, for example, the encoder 21, the waveform generator 17, the filters 23, the amplifier 25, the T/R switch 27, the front end 3, the tracking correlators $31_1$–$31_N$ (corresponding to the UWB waveform correlator 5 of FIG. 3A(1), etc., for controlling, for example, amplifier gains, signal waveforms, filter passbands and notch functions, alternative demodulation and detecting processes, user codes, spreading codes, cover codes, etc.

During signal acquisition, the radio controller and interface 9 adjusts the phase input of, for example, the timing generator $7_1$, in an attempt for the tracking correlator $31_1$ to identify and the match the timing of the signal produced at the receiver with the timing of the arriving signal. When the received signal and the locally generated signal coincide in time with one another, the radio controller and interface 9 senses the high signal strength or high SNR and begins to track, so that the receiver is synchronized with the received signal.

Once synchronized, the receiver will operate in a tracking mode, where the timing generator $7_1$ is adjusted by way of a continuing series of phase adjustments to counteract any differences in timing of the timing generator $7_1$ and the incoming signal. However, a feature of the present invention is that by sensing the mean of the phase adjustments over a known period of time, the radio controller and interface 9 adjusts the frequency of the timing generator $7_1$ so that the mean of the phase adjustments becomes zero. The frequency is adjusted in this instance because it is clear from the pattern of phase adjustments that there is a frequency offset between the timing generator $7_1$ and the clocking of the received signal. Similar operations may be performed on timing generators $7_2$–$7_N$, so that each receiver can recover the signal delayed by different amounts, such as the delays caused by multipath (i.e., scattering along different paths via reflecting off of local objects).

A feature of the transceiver in FIG. 3B is that it includes a plurality of tracking correlators $31_1$–$31_N$. By providing a plurality of tracking correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The radio controller and interface 9 receives the information from the different tracking correlators $31_1$–$31_N$ and decodes the data. The radio controller and interface 9 also provides control signals for controlling the front end 3, e.g., such as gain, filter selection, filter adaptation, etc., and adjusting the synchronization and tracking operations by way of the timing generator module 7, 19.

In addition, the radio controller and interface 9 serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

On the transmit portion of the transceiver shown in FIG. 3B, a timing generator $7_0$ also receives phase, frequency and/or fast modulation adjustment signals for use in encoding a UWB waveform from the radio controller and interface 9. Data and user codes (via a control signal) are provided to the encoder 21, which in the case of an embodiment of the present invention utilizing time-modulation, passes command signals (e.g., $\Delta t$) to the timing generator $7_0$ for providing the time at which to send a pulse. In this way, encoding of the data into the transmitted waveform may be performed.

When the shape of the different pulses are modulated according to the data and/or codes, the encoder 21 produces the command signals as a way to select different shapes for generating particular waveforms in the waveform generator 17. For example, the data may be grouped in multiple data bits per channel symbol. The waveform generator 17 then produces the requested waveform at a particular time as indicated by the timing generator $7_0$. The output of the waveform generator is then filtered in filter 23 and amplified in amplifier 25 before being transmitted via antenna 1, 15 by way of the T/R switch 27.

In another embodiment of the present invention, the transmit power is set low enough that the transmitter and receiver are simply alternately powered down without need for the T/R switch 27. Also, in some embodiments of the present invention, neither the filter 23 nor the amplifier 25 is needed, because the desired power level and spectrum is directly useable from the waveform generator 17. In addition, the filters 23 and the amplifier 25 may be included in the waveform generator 17 depending on the implementation of the present invention.

A feature of the UWB communications system disclosed, is that the transmitted waveform x(t) can be made to have a nearly continuous power flow, for example, by using a high chipping rate, where the wavelets g(t) are placed nearly back-to-back. This configuration allows the system to operate at low peak voltages, yet produce ample average transmit power to operate effectively. As a result, sub-micron geometry CMOS switches, for example, running at one-volt levels, can be used to directly drive antenna 1, 15, such that the amplifier 25 is not required. In this way, the entire radio can be integrated on a single monolithic integrated circuit.

Under certain operating conditions, the system can be operated without the filters 23. If, however, the system is to be operated, for example, with another radio system, the filters 23 can be used to provide a notch function to limit interference with other radio systems. In this way, the system can operate simultaneously with other radio systems, providing advantages over conventional devices that use avalanching type devices connected straight to an antenna, such that it is difficult to include filters therein.

FIG. 3C is a block diagram of a UWB receiver with an RFI extraction mechanism according to one embodiment of the present invention. RF Energy is transmitted to the UWB receiver and coupled in to the antenna 100. The receiver includes a UWB front end processor 302, which sets a passband and adjusts signal levels before subsequent processing. The received UWB signal, noise, and RFI tones are sent to a signal correlator 304 that performs a matched filter operation by correlating the received signal with a copy of the user's coded signal applied to a wavelet series. More particularly, the UWB waveform is originally created by a series of wavelets arranged according to a user specified spreading code. Accordingly, to extract the data from the UWB signal, the correlator 304 correlates a local copy of the UWB waveform (absent the data but with any user code) with the received copy to extract the data. After correlation, the signal is passed to RFI suppressor 110. After RFI is extracted, data contained in the original signal is detected in signal detector 306, and subsequently output.

Here, it is prudent to describe the function of an A/D converter employed in the correlator 304 and its relevance to the present invention, as recognized by the present inventors. The A/D converter is set to a predetermined sample rate. In one embodiment, the sample rate is set to be equal to the bit period of the bits (or channel symbols) output from the signal correlator 304. The sample times are synchronized to the peak levels of the information bit waveforms. As such, the RFI tones in the incoming signal are sampled at the rate of the A/D converter and consequently, under sampled (i.e., sampled at less than the Nyquist rate). By undersampling, the RFI tones will "alias" into the detection bandwidth. Therefore, the RFI interferers that have higher frequencies are actually aliased down to the same frequency band in which the signal detection processing occurs. However, the present inventors recognized that the actual position of the alias terms are not important, as long as the narrowband nature of the RFI is preserved. One processing feature that helps to preserve the narrowband nature of the RFI is to use an A/D converter that is stable, and a signaling scheme that produces data bits at a fixed interval. This way the A/D sample times can be precisely timed to occur where peak outputs of the correlator occur, which also happen to be the optimum times to perform data bit detection. With the narrowband nature of the RFI preserved, the inventors found that it is then possible to easily extract and/or suppress the RFI. Since conventional UWB systems use pulse position modulation, the sample times are noise like, so the RFI alias into noise instead of aliasing to a tone. Furthermore, the PPM pulse rates are much lower that can be afforded by shape modulation where the pulses can be sent with substantially no gap between pulses. Due to the low pulse rates and the purposefully jittered clock, previous PPM systems are incapable of applying this technique. By contrast, the disclosed UWB communication system is architected such that the A/D converter is sampling with a stable, low jitter clock capable of preserving the aliased tones. Even in PPM modes of operation, the A/D converter, over some predetermined number of cycles, provides a fixed sampling interval so that the disclosed system may affect RFI removal.

One, or combinations, of the following parameters can be adjusted to alter the effectiveness of RFI extraction: sample rate, vector length, and number of quantization levels of the signal. The sample rate can be adjusted higher, resulting in less spectral folding and greater resolution for determining peak correlation levels used to make bit decisions. On the other hand, undersampling enables the use of less costly components than the expensive A/D converters that sample fast enough to fully represent the correlation result. The vector length can also be adjusted. If the vector length, i.e., number of samples analyzed while performing RFI detection, is large, processing time is increased, but there is a greater amount of redundancy in the RFI so the RFI tones may be isolated more precisely are may, therefore, be suppressed to a greater degree. On the other hand, a short vector length enables faster processing, but with larger loss of signal strength when RFI is extracted. The number of quantization levels of the signal under analysis may also be adjusted by changing the bit width of the A/D converter. A higher number of quantization levels gives better resolution of RFI and hence, more effective extraction because the RFI can be characterized better. One or more of these parameters can be adjusted alone or in any combination in the embodiments below to affect RFI extraction.

FIG. 3D is a block diagram of one embodiment of the present invention in which there is a UWB receiver with pre and post A/D conversion matched filters for RFI extraction. After the received signal arrives at antenna 100, the signal is converted to an electrical signal and applied to a matched filter 402. Optionally, narrowband RFI excision circuitry may also be applied to the signal from the antenna to provide an initial degree of RFI suppression. The signal then goes to A/D converter 404 where it is digitized at a rate that corresponds with the bit rate. It should be noted that the term "bit" does not necessarily relate to a new information bit, but may also be an encoded bit or other discrete component of a baseband data stream that may or may not be output directly to an end user. After digitization, the sampled signal is applied to RFI removal filter 406, where the filter further extracts residual RFI. The resulting signal is the intended data signal plus white Gaussian noise.

FIG. 3E is the same as FIG. 3D, except RFI removal filter 406 has been replaced by RFI removal algorithm 407. These RFI removal algorithms encompass both time-domain and frequency-domain estimate-and-subtract techniques. The references for these techniques, as well as the references for construction of RFI removal filters, can be found in the Description of the Background.

Figure 4A:
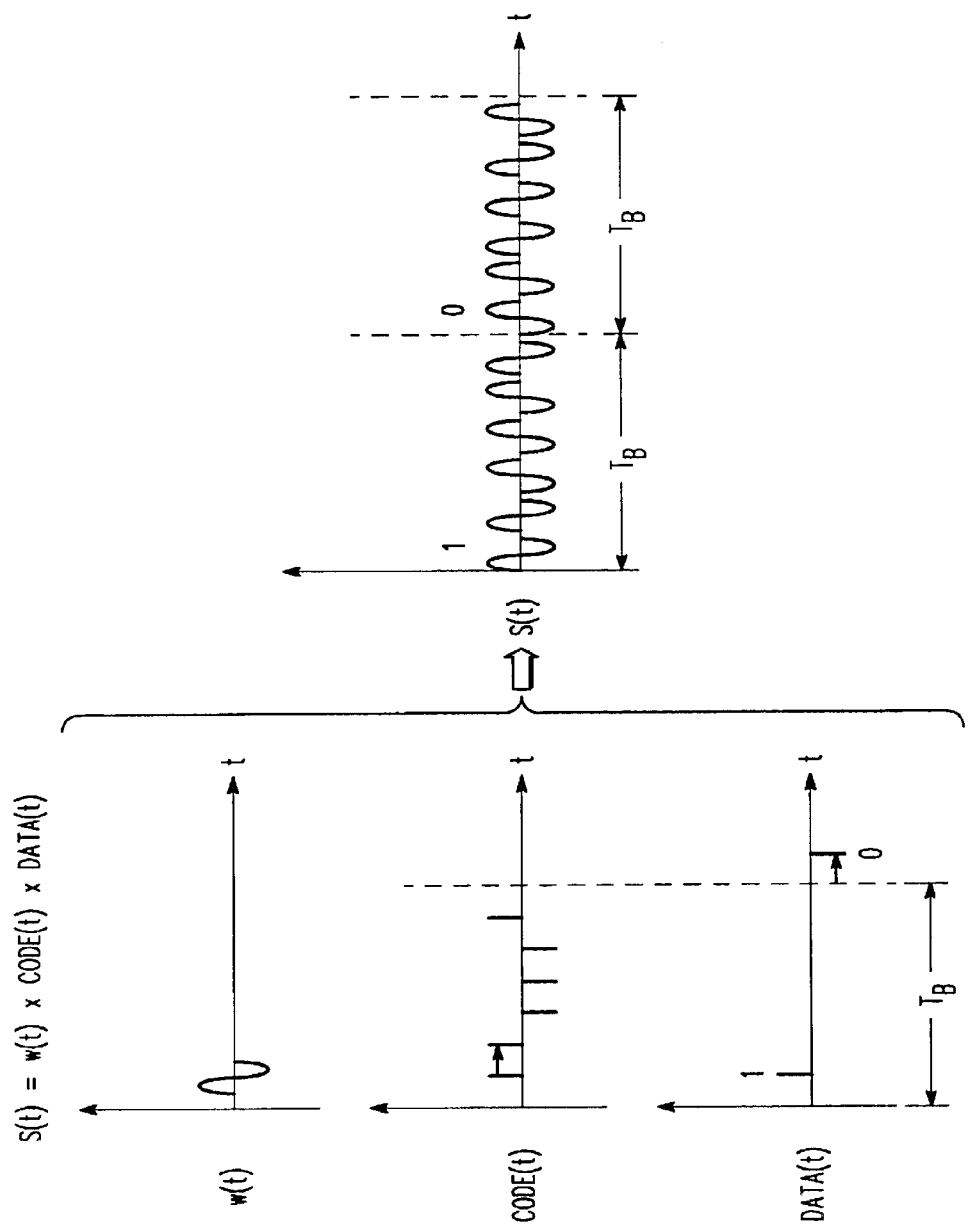
FIG. 4A is a time-domain plot of an incoming UWB signal with constituent parts that are used to create the UWB signal.
Figure 4B:
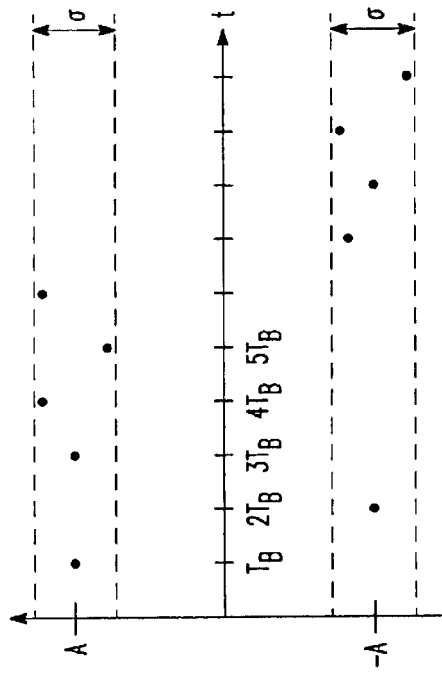
FIGS. 4B-4E are a signal flow diagram of a UWB incoming signal at various points in the UWB receiver.

FIG. 4A shows the composition of an incoming UWB signal s(t). A wavelet w(t) is convolved with a user code signal "code (t)" and input data "data(t)". In this example, the code sequence has the pattern +1, +1, −1, −1, −1, +1 and corresponds with a particular user. The data (presumably from a user and presumed to be binary in this non-limiting example) consists of sequences of two bits, 1 and 0, separated by a bit period $T_b$. So, the data, convolved with a particular user's code sequence and a wavelet, is represented by s(t). The first data bit, 1, is spread over bit period $T_b$ in an encoded pattern of wavelets that corresponds with the user's code. The second data bit, 0, is also spread over a second bit period $T_b$ but with inverted wavelets indicative of the data bit being a "zero". The signal is similarly composed for subsequent data bits over bit period $T_b$. The resulting UWB signal s(t) is a piecewise continuous UWB waveform.

Figure 4C:
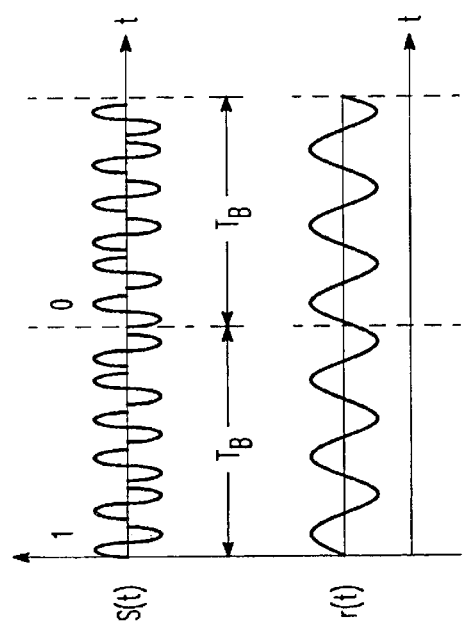
Figure 4D:
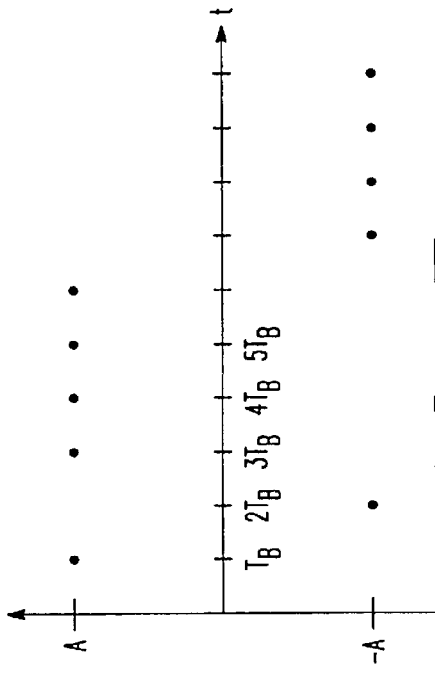

FIGS. 4B-4E show the incoming UWB signal at various locations in the receiver of the first embodiment in FIG. 3D. Between antenna 100 and matched filter 402, the incoming signal includes the UWB signal as described in FIG. 4A and an RFI interferer, r(t), which is viewed as a sinusoidal signal. The incoming signal goes through matched filter 402 (MF1), where the incoming signal is correlated with a local copy of the UWB signal (although absent the data). Matched filter 402 may be viewed as a matched filer because it recreates the wavelet stream generated at the transmitter and correlates the local UWB signal with the received UWB signal. As such, the RFI, mixed with the incoming signal, passes through unscathed in terms of its "narrowband" attributes although perhaps reduced in amplitude by virtue of the spectral shaping performed by the matched filter. So, the output of matched filter 402 is the correlated signals separated by bit period $T_b$. Notice that the sample of FIG. 4C shows a high signal to interference ratio, which allows the UWB data signal to be easily recognizable.

After A/D converter 404, the data signal is represented by a series of sample points at regular intervals of $T_b$ (i.e., one sample point per bit in this example). A/D converter 404 is set to a sample rate that is the same as bit period $T_b$ of the incoming signal, which enables the use of a lower cost A/D converter for this "carrier less" communications scheme. The signal has an amplitude of A and −A, where A indicates the signal level for a bit encoded as a "1" and −A indicates the signal level for a bit encoded as a "0" of the incoming signal. The amplitude varies because of the RFI and noise and so at the detector the variation in the signal is designated σ, in FIGS. 4D and 4E. If σ exceeds some predetermined target amount (e.g A/2), the RFI removal filter, or a controller, determines that before a final bit decision is made, the data samples are applied to the RFI removal filter. In RFI removal filter 406, RFI is extracted from the signal by any one of a variety of techniques, as will be discussed. It should be noted that the RFI, in all likelihood, will have been undersampled. The RFI will tend to have a progressive pattern-effect on the sampled data. For example, the RFI may appear to modulate the data samples, such that the data samples will all not stay tightly clustered around A (or −A), but rather vary in some predictable pattern. Since the UWB piecewise wavelet transmission scheme and receive scheme according to the present invention preserves the narrowand attribute of the RFI, it is clear that in the absence of the strong RFI, and at high SNR, the data should be tightly clustered at A, −A, but if it is not, then it is likely that the RFI is the culprit. Thus, at the output of RFI removal filter 406, the signal follows a bit pattern with amplitudes at A or −A without the variations resulting from RFI (presuming a high SNR and perfect excision of the RFI).

Figure 5A:
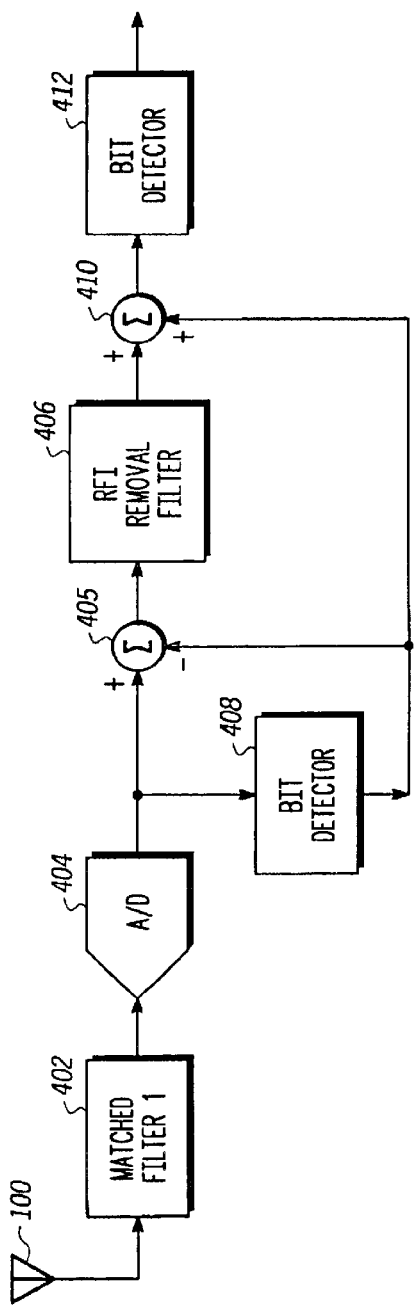
FIGS. 5A-5B are block diagrams of other embodiments of a UWB receiver with a bit detector as part of the RFI extraction mechanism.

FIG. 5A shows another embodiment of the present invention in which a UWB receiver uses bit detection to facilitate RFI extraction in the RFI removal filter. The signal is received at antenna 100, and processed by matched filter 402 and the A/D converter 404. The data bits from the digitized signal are detected in first bit detector 408. The bit detector 408 estimates the desired signal consisting of the bit values and amplitudes. The bit estimate is given as $\hat{b}_i = \text{sign}(x_i)$ where $x_i$ is the sample value, and the amplitude estimate is given as:

$$\hat{A} = \frac{1}{N} \sum_{i=1}^{N} |x_i|$$

where N is the length of the data vector being processed. The output of first bit detector 408, $\hat{A}\hat{b}$, is subtracted from the digitized signal at summer 405. The output of summer 405 is the RFI estimate plus noise. The RFI goes into RFI removal filter 406, where RFI is detected and removed. The remaining signal from RFI removal filter 406 is added to the output of first bit detector 408 at summer 410 to produce a "cleaned" data signal. The output of summer 410 goes to second bit detector 412, where the incoming data bits are again detected. The result of the output of second bit detector 412 is a good signal with the RFI cancelled. The RFI signal may be cancelled at other locations as well, such as in the matched filter or in the downstream processor.

Figure 5B:
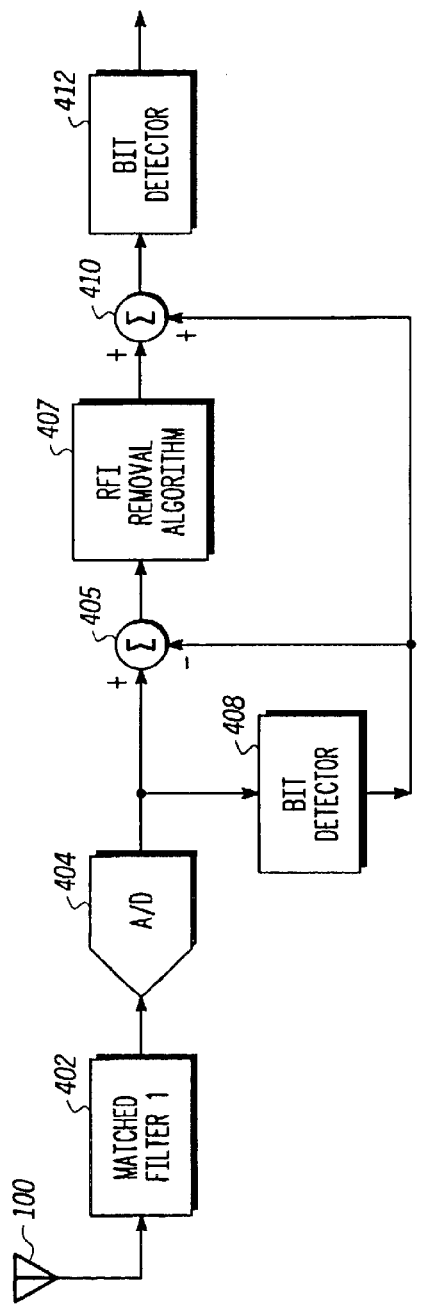

FIG. 5B is the same as FIG. 5A, except RFI removal filter 406 has been replaced by RFI removal algorithm 407.

Figure 6A:
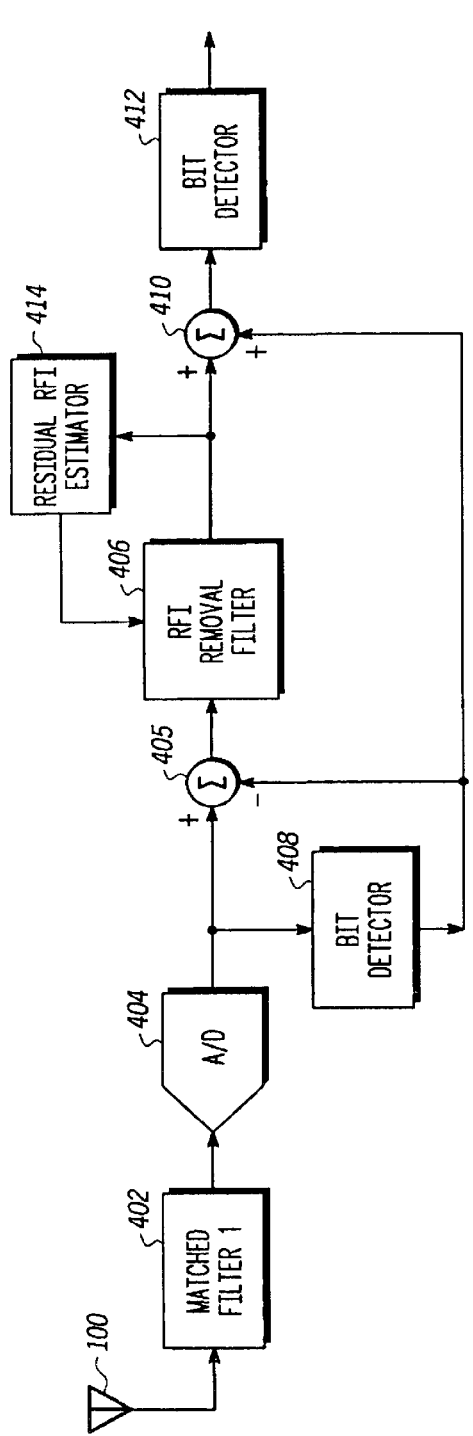
FIG. 6A is a block diagram of an embodiment of a UWB receiver with an adaptive filter for improved RFI extraction.

FIG. 6A shows an embodiment of the present invention in which a UWB receiver includes an adaptive filter for RFI extraction. Similar to FIGS. 3 and 5, the signal is received at antenna 100, processed by the matched filter 402, and digitized at A/D converter 404. As in the previous embodiment, the digitized signal goes into first bit detector 408, where an estimate of the desired signal is derived. The output of first bit detector 408 is subtracted from the digitized signal at summer 405. The output of summer 405 is the RFI estimate plus noise. The RFI goes into RFI removal filter 406, where RFI is filtered. The output from RFI removal filter 406 goes to residual RFI estimator 414, which estimates residual RFI in that output. If the observed residual RFI is above a predetermined threshold (or other metric appropriate for the type of RFI experienced), estimator 414 dispatches a control signal to RFI removal filter 406 to update the filter so that it can remove observed RFI signals. RFI removal filter 406 is then adapted to include the estimated RFI to improve extraction in subsequent incoming signals. The output of RFI removal filter 406 is added to the output of first bit detector 408 at summer 410. The output of summer 410 goes to second bit detector 412, where the UWB signal is further extracted. The RFI signal may be cancelled at other locations as well, such as in the matched filter or in the downstream processor.

Figure 6B:
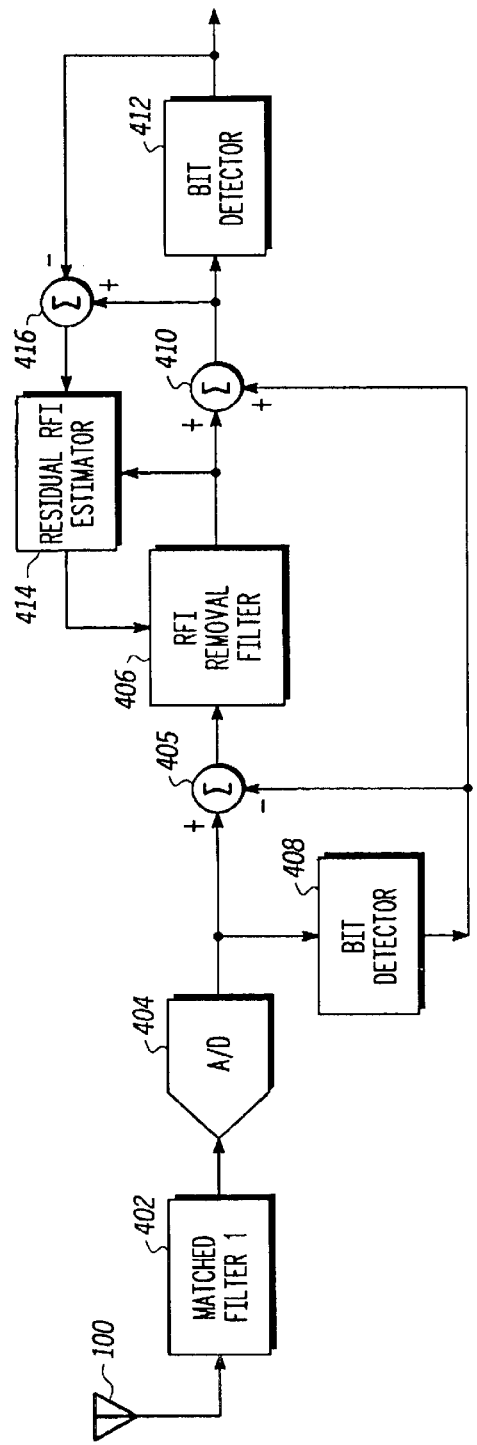
FIG. 6B is a block diagram of another embodiment of a UWB receiver with an adaptive filter for improved RFI extraction.

FIG. 6B shows another embodiment of the present invention in which a UWB receiver includes an adaptive filter for RFI extraction. Similar to FIG. 6A, RFI removal filter 406 is adaptively updated to remove residual RFI. In this embodiment of FIG. 6B, the output of second bit detector 412 is subtracted from the output of summer 410 at summer 416. The output of summer 416 goes into residual RFI estimator 414, where a good estimate of RFI is made. As in FIG. 6A, if the observed residual RFI is above a predetermined threshold (or other metric appropriate for the type of RFI experienced), estimator 414 dispatches a control signal to RFI removal filter 406 to subtract the observed RFI signal. RFI removal filter 406 is then adjusted to include the estimated RFI to improve extraction in subsequent incoming signals. The RFI signal may be cancelled at other locations as well, such as in the matched filter or in the downstream processor.

Figure 6C:
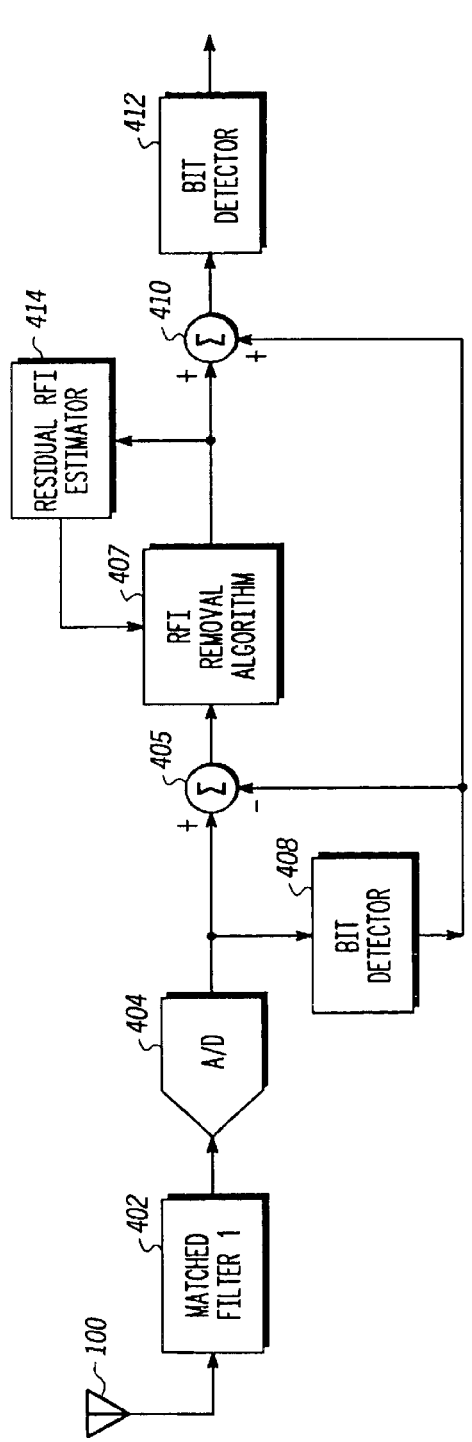
FIG. 6C is a block diagram of an embodiment of a UWB receiver with an adaptive algorithm for improved RFI extraction.

FIG. 6C is the same as FIG. 6A, except RFI removal filter 406 has been replaced by RFI removal algorithm 407.

Figure 6D:
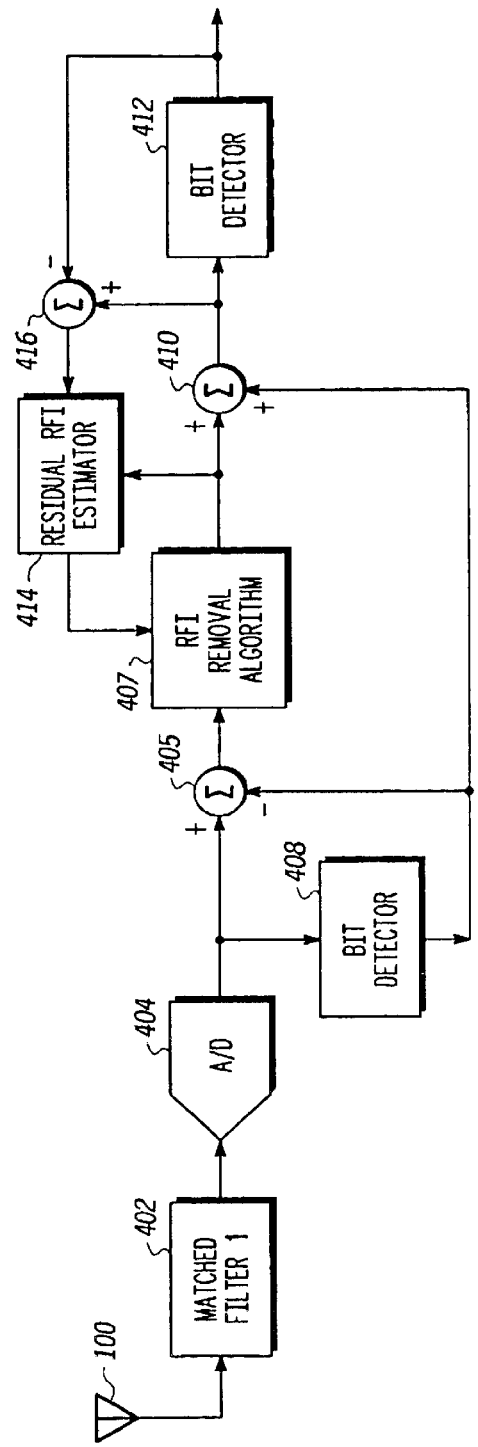
FIG. 6D is a block diagram of another embodiment of a UWB receiver with an adaptive algorithm for improved RFI extraction.

FIG. 6D is the same as FIG. 6B, except RFI removal filter 406 has been replaced by RFI removal algorithm 407.

Figure 4E:
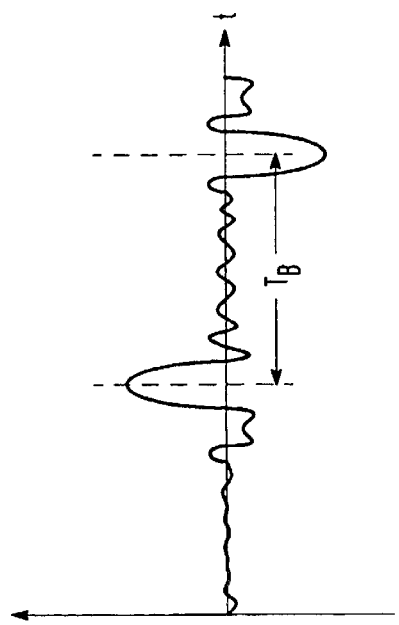

As RFI removal filter 406 in FIGS. 6A-6B adapts to the residual RFI tones, the output after RFI removal filter 406 moves toward that depicted in FIG. 4E. That is, subsequent variations in the signal amplitude decrease to a point where the variations are dominated by white noise. At that point, RFI removal filter 406 matches the incoming RFI signal such that all significant RFI tones are removed in the incoming signal.

Figure 7A:
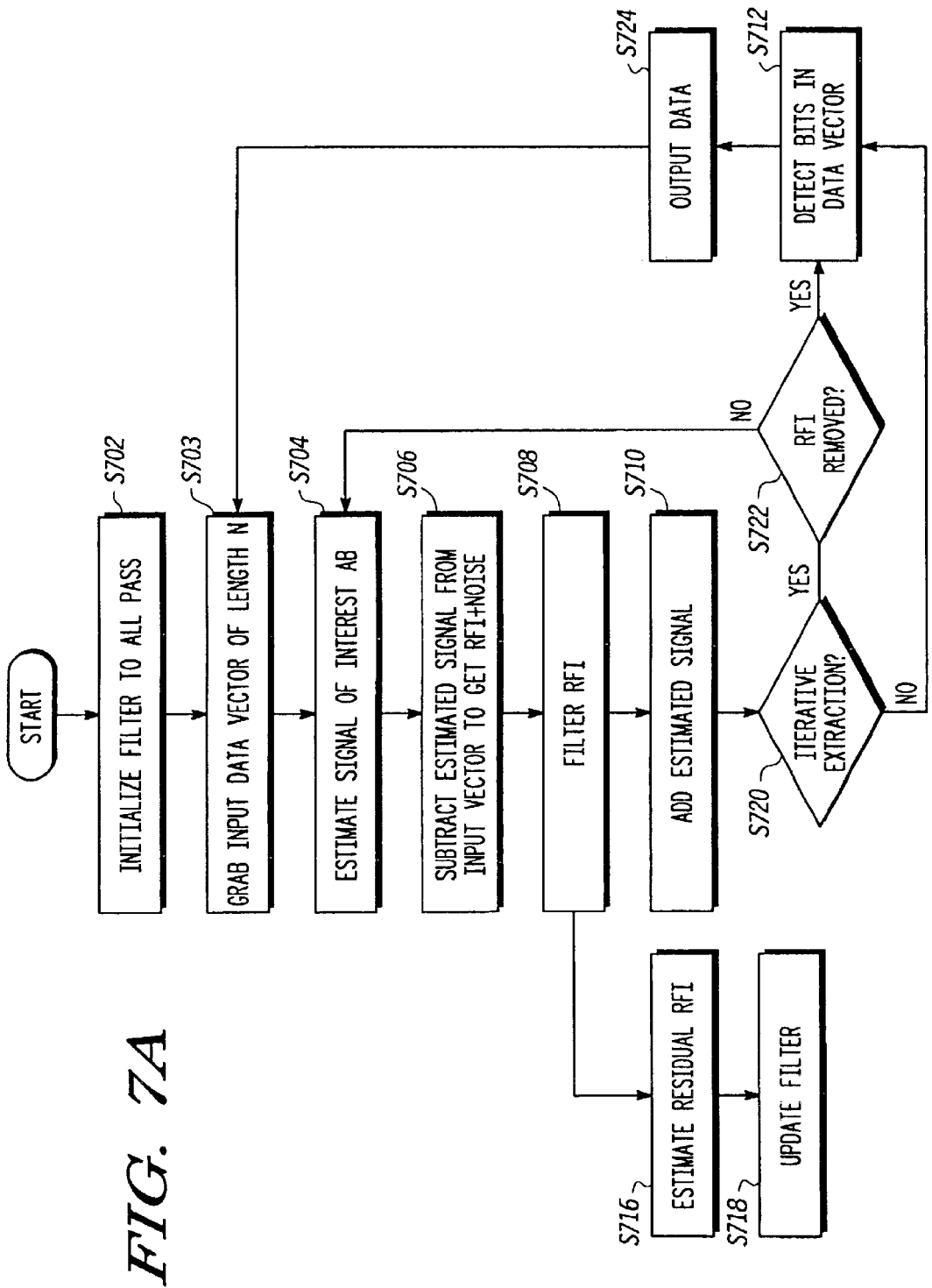
FIG. 7A is a flowchart of a process employed by the RFI extraction mechanism of FIG. 6A that adaptively extracts RFI.

Accordingly, FIG. 7A is a flowchart of a method for adaptively and iteratively canceling RFI by adapting RFI removal filter 406 of FIG. 6A. The process begins with step S702, where RFI removal filter 406 is initialized as an allpass filter such that all RFI is passed unscathed. Next the incoming signal (i.e., data vector) goes through A/D converter 404 and is input to first bit detector 408 in step S703. Next, in first bit detector 408, step S704 estimates bit values and signal amplitude in the digitized signal. In step S706, the estimated signal is subtracted from the digitized signal at summer 405 to get an estimate of the RFI. In step S708, the RFI estimate from summer 405 is filtered. The estimate of the desired signal from first bit detector 408 is added to the output of RFI removal filter 406 in summer 410. This is step S710. The output of the RFI filter 406 is fed to a residual RFI estimation block 414 in step S716. The output of the residual RFI estimation block is used to update the RFI removal filter in step S718. In step S720, an inquiry is made whether the RFI extraction is iterative. If not, the output of summer 410 is fed to a second bit detector 412 in step S712. The signal detected from second bit detector 412 is output in step S724. The process then repeats beginning with step S703, where more incoming data is processed. If the RFI extraction process is iterative, then a second inquiry is made in step S722 whether all residual RFI has been removed. If not, the process returns to step S704 and repeats. If all the residual RFI has been removed, then the output of summer 410 is fed to a second bit detector 412 in step S712. The signal detected from second bit detector 412 is output in step S724. The process then repeats beginning with step S703 for more incoming data.

Figure 7B:
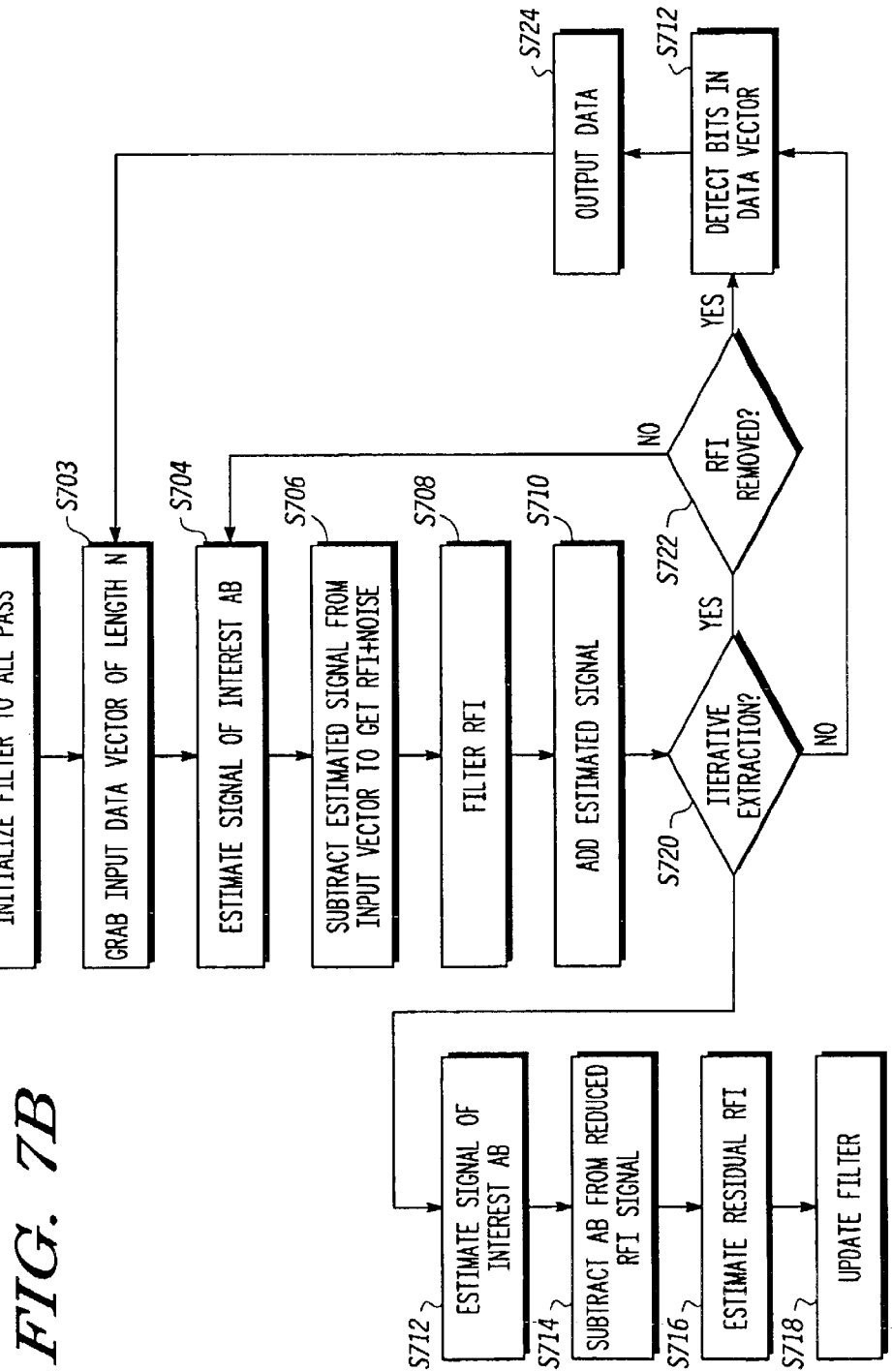
FIG. 7B is a flowchart of a process employed by the RFI extraction mechanism of FIG. 6B that adaptively extracts RFI.

FIG. 7B is a flow chart of a method for adaptively canceling RFI by adapting RFI removal filter 406 as shown in FIG. 6B. The process is similar to the process of FIG. 7A. The exception lies in the process applied to update the RFI removal filter. Following step S710, in which the estimate of the desired signal from first bit detector 408 is added to the output of RFI removal filter 406 in summer 410, the output of summer 410 is applied to bit detector 412 in step S712. Here, the output of second bit detector 412 is subtracted from the output of summer 410 in step S714. The result is the estimate of residual RFI in the signal. In step S716, the output of summer 416 is estimated in estimator 414. Based on the estimate of the RFI remaining in the signal, RFI removal filter 416 is updated in step S718.

Figure 7C:
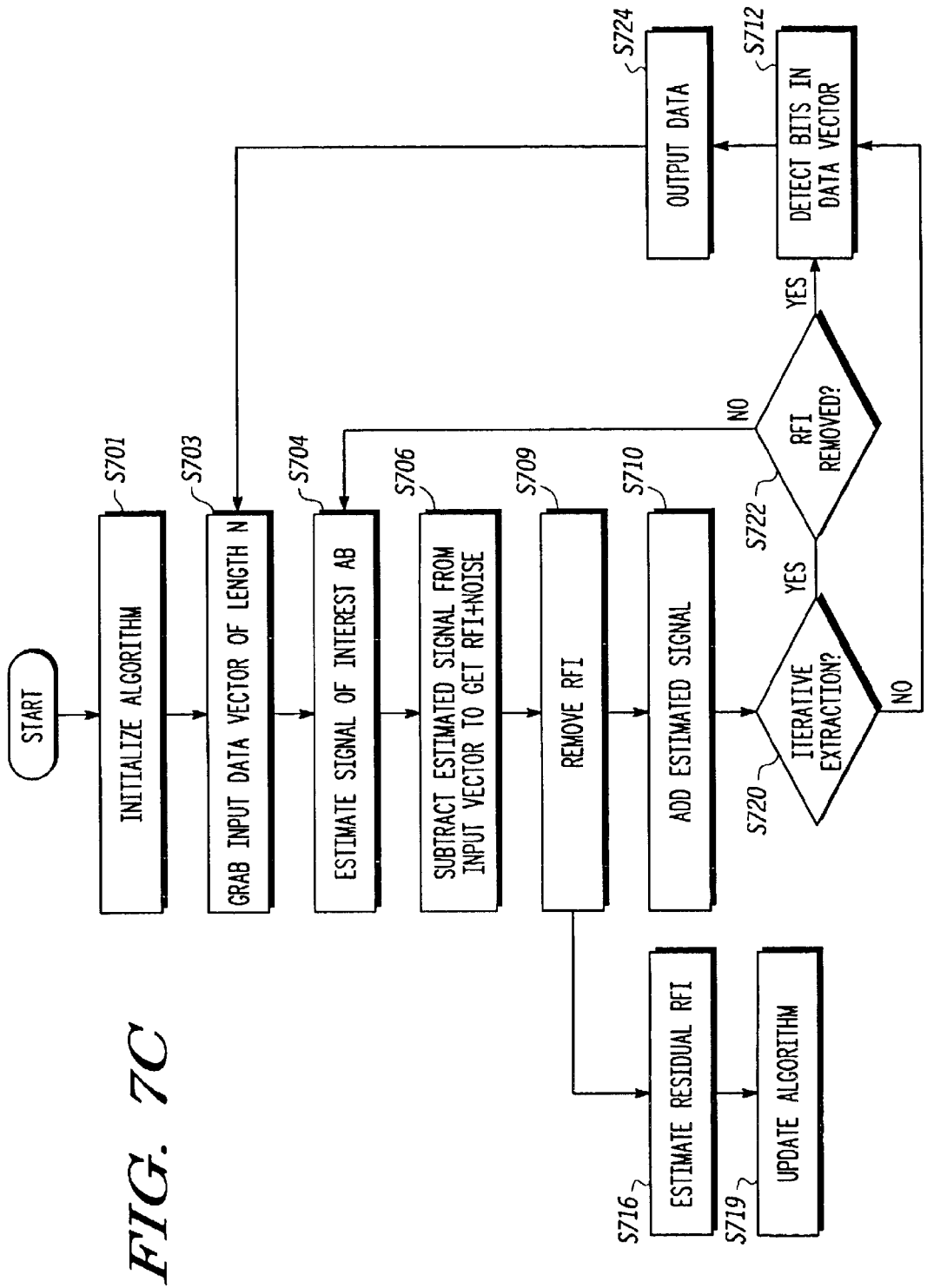
FIG. 7C is a flowchart of a process employed by the RFI extraction mechanism of FIG. 6C that adaptively extracts RFI.

FIG. 7C is the same as FIG. 7A, except blocks 5702, 5708, and 5718 have been replaced by blocks 5701, 5709, and 5719, respectively.

Figure 7D:
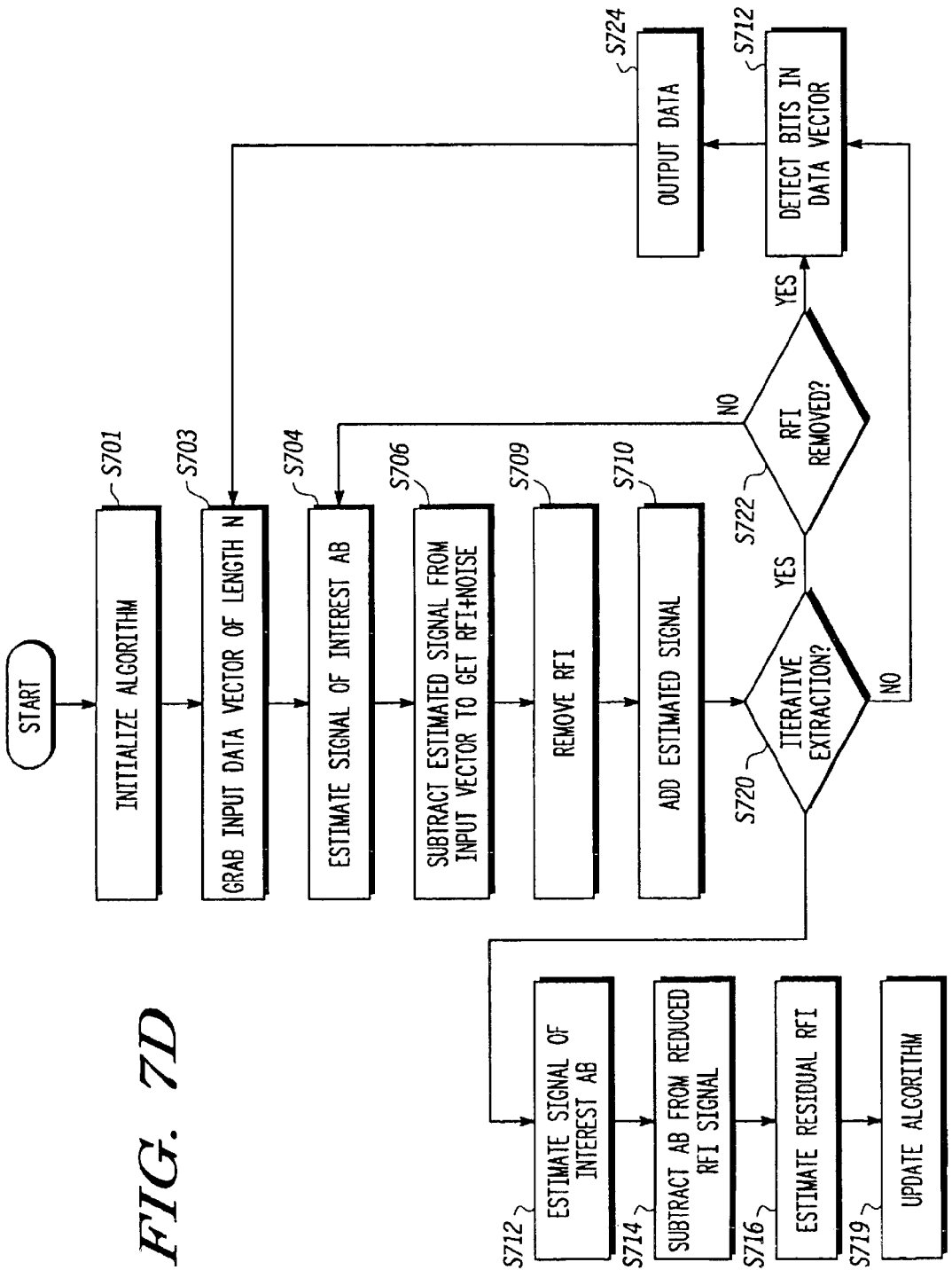
FIG. 7D is a flowchart of a process employed by the RFI extraction mechanism of FIG. 6D that adaptively extracts RFI.

FIG. 7D is the same as FIG. 7B, except blocks 5702, 5708, and 5718 have been replaced by blocks 5701, 5709, and 5719, respectively.

FIG. 8A shows another embodiment of an adaptive RFI mechanism similar to FIG. 6B, with the exception of a controller 418 and a sensor 420 that replace the residual RFI estimator 414 of FIG. 6B. Sensor 420 detects the RFI in the output of the summer 416. The controller 418 calculates the required setting of RFI removal filter 406 in order to extract the residual RFI. The controller 418 sends the setting to RFI removal filter 406, which then adapts for subsequent incoming signals.

FIG. 8B is the same as FIG. 8A, except RFI removal filter 406 has been replaced by RFI removal algorithm 407.

Figure 9:
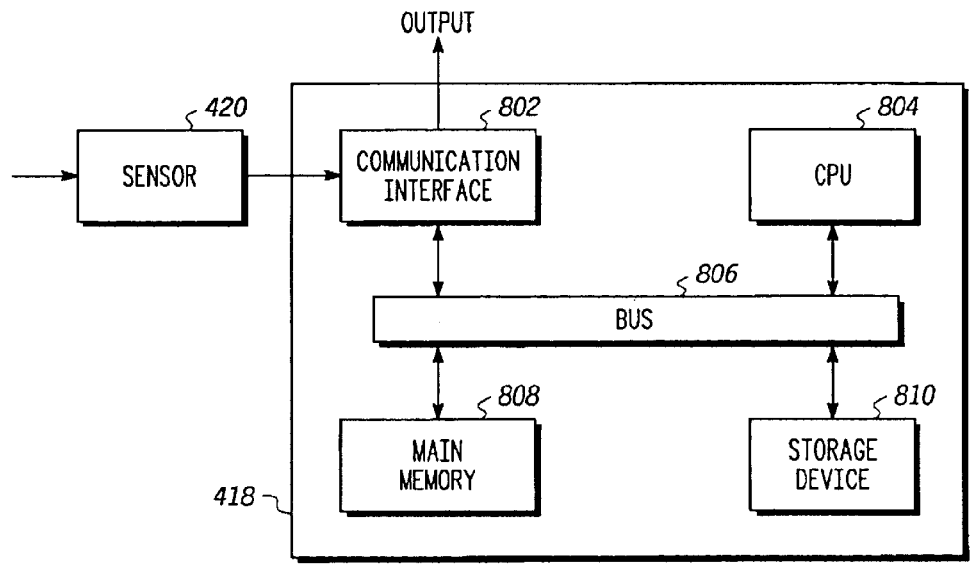
FIG. 9 is a block diagram of the controller of FIG. 8 used to adaptively adjust the matched filter for extracting RFI.

FIG. 9 shows an embodiment of the controller 418 of FIG. 8. The controller 418 includes a CPU 804 that communicates with other components in the controller by way of a bus 806. The bus 806 interconnects a main memory 808, which may be a random access memory (RAM) or other dynamic storage devices (e.g., dynamic RAM (DRAM), static RAM (SRAM), and synchronous DRAM (SDRAM)) holding different values, such as settings to be adjusted by RFI removal filter 406. A storage device 810, is possibly a semiconductor memory although it may be a magnetic hard drive or a removable media drive (e.g., a floppy disk drive, a read-only compact disk drive, a read/write compact disk drive, a compact disk jukebox, a tape drive, and a removal magneto-optical drive), is also included so that different identification and control processes may be loaded into the CPU 804 for extracting different RFI. The bus 806 also interconnects the CPU 804 with a communication interface 802 that receives information from the sensor 420 and also provides the output signal. The communications interface 802 may be a discrete line, or also conventional IO port, such as a parallel port, serial port, or merely a local-bus or control line.

The UWB transceiver of FIGS. 3A(1), 3A(2), and 3B may be used to perform a radio transport function for interfacing with different applications as part of a stacked protocol architecture. In such a configuration, the UWB transceiver performs signal creation, transmission and reception functions as a communications service to applications that send data to the transceiver and receive data from the transceiver much like a wired I/O port. Moreover, the UWB transceiver may be used to provide a wireless communications function to any one of a variety of devices that may include interconnection to other devices either by way of wired technology or wireless technology. Thus, the UWB transceiver of FIG. 3B may be used as part of a local area network (LAN) connecting fixed structures or as part of a wireless personal area network (WPAN) connecting mobile devices, for example. In any such implementation, all or a portion of the present invention may be conveniently implemented in a microprocessor system using conventional general purpose microprocessors programmed according to the teachings of the present invention, as will be apparent to those skilled in the microprocessor systems art. Appropriate software can be readily prepared by programmers of ordinary skill based on the teachings of the present disclosure, as will be apparent to those skilled in the software art.

Figure 10:
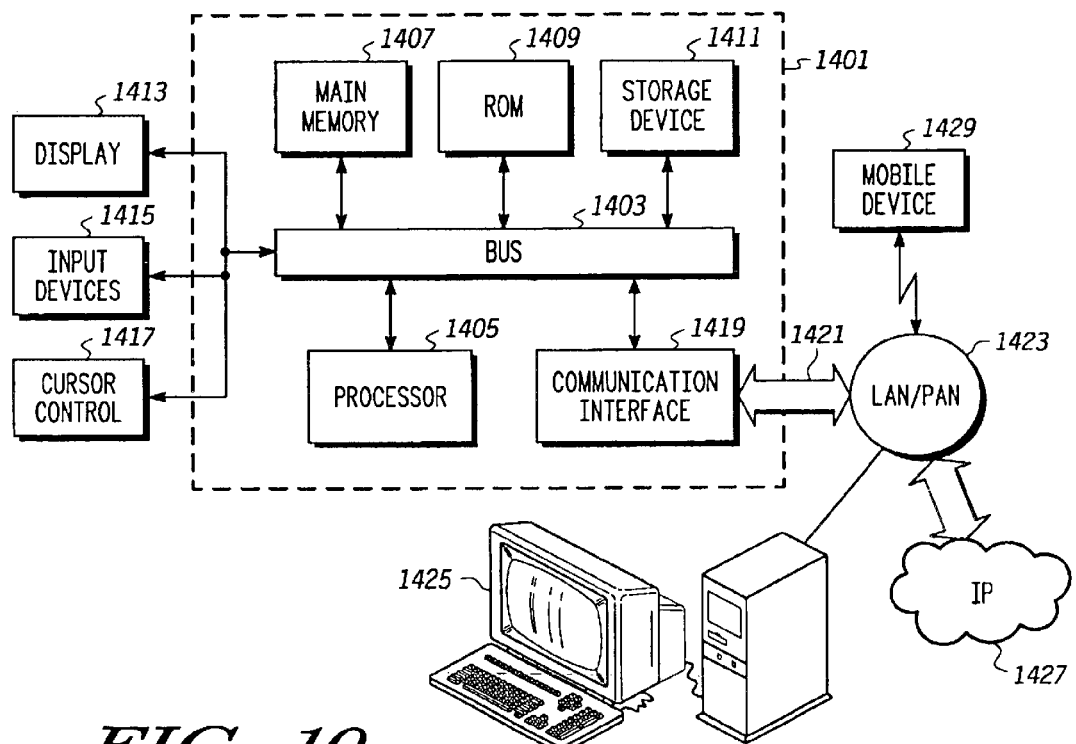
FIG. 10 shows a processor system upon which an embodiment of the present invention may be implemented.

FIG. 10 illustrates a processor system 1401 upon which an embodiment according to the present invention may be implemented. The system 1401 includes a bus 1403 or other communication mechanism for communicating information, and a processor 1405 coupled with the bus 1403 for processing the information. The processor system 1401 also includes a main memory 1407, such as a random access memory (RAM) or other dynamic storage device (e.g., dynamic RAM (DRAM), static RAM (SRAM), synchronous DRAM (SDRAM), flash RAM), coupled to the bus 1403 for storing information and instructions to be executed by the processor 1405. In addition, a main memory 1407 may be used for storing temporary variables or other intermediate information during execution of instructions to be executed by the processor 1405. The system 1401 further includes a read only memory (ROM) 1409 or other static storage device (e.g., programmable ROM (PROM), erasable PROM (EPROM), and electrically erasable PROM (EEPROM)) coupled to the bus 1403 for storing static information and instructions for the processor 1405. A storage device 1411, such as a magnetic disk or optical disc, can be provided and coupled to the bus 1403 for storing information and instructions.

The processor system 1401 may also include special purpose logic devices (e.g., application specific integrated circuits (ASICs)) or configurable logic devices (e.g., simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high density media drives, may be added to the system 301 using an appropriate device bus (e.g., a small system interface (SCSI) bus, an enhanced integrated device electronics (IDE) bus, or an ultra-direct memory access (DMA) bus). The system 1401 may additionally include a compact disc reader, a compact disc reader-writer unit, or a compact disc juke box, each of which may be connected to the same device bus or another device bus.

The processor system 1401 may be coupled via the bus 1403 to a display 1413, such as a cathode ray tube (CRT) or liquid crystal display (LCD) or the like, for displaying information to a system user. The display 1413 may be controlled by a display or graphics card. The processor system 1401 includes input devices, such as a keyboard or keypad 1415 and a cursor control 1417, for communicating information and command selections to the processor 1405. The cursor control 1417, for example, is a mouse, a trackball, or cursor direction keys for communicating direction information and command selections to the processor 1405 and for controlling cursor movement on the display 1413. In addition, a printer may provide printed listings of the data structures or any other data stored and/or generated by the processor system 1401.

The processor system 1401 performs a portion or all of the processing steps of the invention in response to the processor 1405 executing one or more sequences of one or more instructions contained in a memory, such as the main memory 1407. Such instructions may be read into the main memory 1407 from another computer-readable medium, such as a storage device 1411. One or more processors in a multi-processing arrangement may also be employed to execute the sequences of instructions contained in the main memory 1407. In alternative embodiments, hard-wired circuitry may be used in place of or in combination with software instructions. Thus, embodiments are not limited to any specific combination of hardware circuitry and software.

As stated above, the processor system 1401 includes at least one computer readable medium or memory programmed according to the teachings of the invention and for containing data structures, tables, records, or other data described herein. Stored on any one or on a combination of computer readable media, the present invention includes software for controlling the system 1401, for driving a device or devices for implementing the invention, and for enabling the system 1401 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 1405 for execution. A computer readable medium may take many forms, including but not limited to, non-volatile media, volatile media, and transmission media. Non-volatile media includes, for example, optical, magnetic disks, and magneto-optical disks, such as the storage device 1411. Volatile media includes dynamic memory, such as the main memory 1407. Transmission media includes coaxial cables, copper wire and fiber optics, including the wires that comprise the bus 1403. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 1405 for execution. For example, the instructions may initially be carried on a magnetic disk of a remote computer. The remote computer can load the instructions for implementing all or a portion of the present invention remotely into a dynamic memory and send the instructions over a telephone line using a modem.

A modem local to system 1401 may receive the data on the telephone line and use an infrared transmitter to convert the data to an infrared signal. An infrared detector coupled to the bus 1403 can receive the data carried in the infrared signal and place the data on the bus 1403. The bus 1403 carries the data to the main memory 1407, from which the processor 1405 retrieves and executes the instructions. The instructions received by the main memory 1407 may optionally be stored on a storage device 1411 either before or after execution by the processor 1405.

The processor system 1401 also includes a communication interface 1419 coupled to the bus 1403. The communications interface 1419 provides a two-way UWB data communication coupling to a network link 1421 that is connected to a communications network 1423 such as a local network (LAN) or personal area network (PAN) 1423. For example, the communication interface 1419 may be a network interface card to attach to any packet switched UWB-enabled personal area network (PAN) 1423. As another example, the communication interface 1419 may be a UWB accessible asymmetrical digital subscriber line (ADSL) card, an integrated services digital network (ISDN) card, or a modem to provide a data communication connection to a corresponding type of communications line. The communications interface 1419 may also include the hardware to provide a two-way wireless communications coupling other than a UWB coupling, or a hardwired coupling to the network link 1421. Thus, the communications interface 1419 may incorporate the UWB transceiver of FIG. 3A(1) and/or FIG. 3B as part of a universal interface that includes hardwired and non-UWB wireless communications coupling to the network link 1421.

The network link 1421 typically provides data communication through one or more networks to other data devices. For example, the network link 1421 may provide a connection through a LAN to a host computer 1425 or to data equipment operated by a service provider, which provides data communication services through an IP (Internet Protocol) network 1427. Moreover, the network link 1421 may provide a connection through a PAN 1423 to a mobile device 1429 such as a personal data assistant (PDA) laptop computer, or cellular telephone. The LAN/PAN communications network 1423 and IP network 1427 both use electrical, electromagnetic or optical signals that carry digital data streams. The signals through the various networks and the signals on the network link 1421 and through the communication interface 1419, which carry the digital data to and from the system 1401, are exemplary forms of carrier waves transporting the information. The processor system 1401 can transmit notifications and receive data, including program code, through the network(s), the network link 1421 and the communication interface 1419.

Obviously, numerous modifications and variations of the present invention are possible in light of the above teachings. It is therefore to be understood that within the scope of the appended claims, the invention may be practiced otherwise than as specifically described herein.

What is claimed is:

1. A baseband RFI extraction mechanism configured to pass an ultra wideband (UWB) signal while suppressing a narrowband interference signal that overlaps said UWB signal in frequency and has been undersampled, comprising:

a filter configured to identify a frequency of said narrowband interference signal after having been undersampled in order to extract said narrowband interference signal from said UWB signal at baseband, wherein said filter including a narrowband interference identification mechanism that is configured to identify the frequency of said narrowband interference signal and change filter parameters of said filter to suppress said narrowband interference signal at said frequency.

2. The baseband RFI mechanism of claim 1, wherein said frequency is an alias frequency of said narrowband interfere signal and said filter is configured to identify and cancel a second frequency at which another alias of said narrowband interference signal is located.

3. A UWB receiver comprising:

an A/D converter configured to digitize an incoming signal, said incoming signal including a narrowband interference signal and an ultra wideband (UWB) signal, said A/D converter having a predetermined sampling rate that is less than a Nyquist frequency for sampling said narrowband interference signal;

an RFI extraction mechanism including a filter configured to identify and remove an undersampled version of said narrowband inference signal so as to improve a UWB signal to interference ratio; and a detector that detects data in said UWB signal after said RFI mechanism improves the UWB signal to interference ratio by suppressing the narrowband interference signal.

4. A receiver as claimed in claim 3, wherein the A/D converter is configured to undersample said narrowband signal and cause said narrowband signal to reside in a same frequency band in which baseband processing occurs on said UWB signal.

5. A receiver as claimed in claim 3, wherein a sample rate of said A/D converter is adjustable to affect a completeness of extraction of said narrowband signal.

6. A receiver as claimed in claim 3, wherein a quantization level at which said A/D converter digitizes said incoming signal is adjustable to affect a completeness with which extraction of said narrowband signal is achieved.

7. A receiver as claimed in claim 3, wherein a vector length of said incoming signal is adjustable to affect a completeness with which extraction of said narrow band signal is achieved.

8. A receiver as claimed in claim 3, wherein the A/D converter operates at a predetermined sample rate that is set to a multiple of a bit rate of data bits in said UWB signal.

9. A baseband RFI extraction mechanism for passing a desired UWB signal portion of an incoming signal while suppressing a narrowband interference signal that overlaps said desired UWB signal, comprising:

a bit detector configured to detect bits encoded in the desired UWB signal;

a subtraction mechanism configured to subtract a portion of the UWB signal having a detected bit contained therein from said incoming signal;

an interference estimator configured to estimate the narrowband interference signal after said subtraction mechanism removed the portion of the UWB signal containing the bit from the incoming signal; and a filter configured to operate at baseband and extract said narrowband interference signal from a received signal, which is a down connected version of said incoming signal, based on the estimate of the narrowband interference signal made by the interference estimator.

10. A baseband RFI extraction mechanism as claimed in claim 9, further comprising:
  a signal combiner configured to subtract said desired UWB signal from said incoming signal resulting in a residual narrowband interference signal.

11. A UWB receiver comprising:
  an A/D converter configured to digitize an incoming signal, said incoming signal including a narrowband interference signal and a UWB signal, said A/D converter having a predetermined sampling rate that is less than a nyquist frequency for said narrowband interference; and
  a bit detector configured to detect bits encoded in the desired UWB signal;
  a subtraction mechanism configured to subtract a portion of the UWB signal having a detected bit contained therein from said narrowband interference signal;
  an interference estimator configured to estimate the narrowband interference signal after said subtraction mechanism removed the portion of the UWB signal containing the bit; and
  a filter configured to extract said narrowband interference signal from the incoming signal based on the estimate of the narrowband interference signal made by the interference estimator.

12. A receiver as claim in claim 11, wherein a sample rate of said A/D converter is adjustable to affect a completeness of extraction of said narrowband interference signal.

13. A receiver as claimed in claim 11, wherein the A/D converter is configured to under sample said narrow band signal and cause said narrow band interference signal to reside in a same frequency band in which baseband processing occurs.

14. A receiver as claimed in claim 11, wherein a quantization level of said incoming signal is adjusted to affect a completeness of extraction of said narrow band interference signal.

15. A receiver as claimed in claim 11, wherein a vector length of said incoming signal is adjusted to affect a completeness of extraction of said narrow band interference signal.

16. An RFI extraction mechanism for passing a desired UWB signal while suppressing a narrowband interference signal that overlaps in frequency said UWB signal, comprising:
  a bit detector configured to detect bits of the desired UWB signal part of an incoming signal, and extract said desired UWB signal from said incoming signal;
  a filter configured to identify a frequency of said narrowband interference signal in order to extract said narrowband interference signal from said incoming signal; and
  an estimator configured to estimate an amount said narrowband interference signal that is residual from at least one of said bit detector and said filter.

17. An RFI extraction mechanism as claimed in claim 16, further comprising:
  a combiner configured to subtract said desired UWB signal from said incoming signal resulting in said residual narrowband interference signal.

18. An RFI extraction mechanism as claimed in claim 16, wherein the estimator is configured to detect a frequency of said narrowband interference signal that is provided to said filter so as to improve performance by further suppressing said narrowband interference signal in subsequent incoming signals.

19. A UWB receiver comprising:
  an A/D converter configured to undersample a RFI signal residing on an incoming UWB signal;
  an RFI extraction mechanism including
    a bit detector configured to detect bits of an incoming UWB signal, wherein said bits are from a desired data signal encoded in said UWB signal, and extract said desired signal from said incoming signal,
    a filter configured to match a narrowband interference signal to a reference signal in order to extract said narrowband interference signal, and
    an estimator configured to estimate said narrowband interference signal that remains after being processed by said filter; and
  a data detector configured to detect data in said UWB signal after said RFI mechanism extracts said RFI signal from said UWB signal.

20. A receiver as claimed in claim 19, wherein the A/D converter is configured to under sample said RFI signal and cause alias terms of said RFI signal to reside in a same frequency band in which baseband processing occurs.

21. A receiver as claimed in claim 19, wherein a sample rate of said A/D converter is adjustable so as to affect a completeness of extraction of said RFI signal.

22. A receiver as claimed in claim 19, wherein a quantization level of said incoming signal is adjustable so as to affect a completeness of extraction of said RFI signal.

23. A receiver as claimed in claim 19, wherein a vector length of said incoming signal is adjusted so as to affect a completeness of extraction of said RFI signal.

24. A receiver as claimed in claim 19, wherein said RFI extraction mechanism being configured to interactively update and remove said narrowband interference signal.

25. A baseband RFI extraction mechanism for passing a desired UWB signal while suppressing a narrowband interference signal that overlaps in frequency said desired UWB signal, comprising:
  a narrowband interference suppression filter;
  a controller configured to controllably set filter parameters of the narrowband interference suppression filter to remove the narrowband interference signal after said narrowband interference signal has been undersampled; and
  a sensor configured to detect a signal energy level of said narrowband interference signal and provide feature data to said controller regarding features of said narrowband interference signal.

26. An RFI extraction mechanism as claimed in claim 25, wherein the controller further comprises:
  a processor configured to calculate said filter parameters of said filter.

27. A UWB receiver comprising:
  an A/D converter configured to sample an incoming UWB signal and undersample a narrowband interference signal; and
  an RFI extraction mechanism including
    a narrowband interference suppression filter;
    a controller configured to controllably set filter parameters of the narrowband interference suppression filter to remove the narrowband interference signal after said narrowband interference signal has been undersampled; and
    a sensor configured to detect a signal energy level of said narrowband interference signal and provide feature data to said controller regarding features of said narrowband interference signal; and a data detector configured to detect data in said UWB signal after said RFI extraction mechanism extracted the narrowband interference signal.

28. A receiver as claimed in claim 27, wherein the A/D converter which under sampled said narrow band signal causes said narrow band signal to reside in a same frequency band in which base band processing occurs.

29. A receiver as claimed in claim 27, wherein a sample rate of said A/D converter is adjusted so as to affect an increased suppression of said narrow band signal.

30. A receiver as claimed in claim 27, wherein a quantization level of said incoming is adjusted to affect and increased suppression of said narrow band signal.

31. A receiver as claimed in claim 27, wherein a vector length of said incoming signal is adjustable to so as to affect increased suppression of said narrow band signal.

32. A receiver as claimed in claim 27, wherein said RFI extraction mechanism is interactively updated with different filter parameters so as to adjust for changes in said narrowband interference signal.

33. A method for changing filter parameters in order to adaptively cancel a narrowband interference signal from a UWB signal, comprising the steps of:

detecting bits of a desired UWB signal;

subtracting said bits of said UWB signal from an incoming signal in order to obtain an accurate estimate of said narrowband interference signal;

estimating a frequency of said narrowband interference signal; and changing filter parameters of a filter to suppress said narrowband interference signal at said frequency estimated in said estimating step.

34. A method as claimed in claim 33, further comprising steps of:

subtracting said narrowband interference signal from said incoming signal so as to obtain a processed UWB signal; and outputting said processed UWB signal.

35. A method as claimed in claim 33, wherein the estimating said narrow band interference signal step further comprises:

detecting signal energy of said narrow band interference signal; and calculating new filter parameters for a changing filter characteristic of said filter.

* * * * *

UNITED STATES PATENT AND TRADEMARK OFFICE
CERTIFICATE OF CORRECTION

| | | |
|---|---|---|
| PATENT NO. | : 6,834,073 B1 | |
| APPLICATION NO. | : 09/685203 | |
| DATED | : December 21, 2004 | |
| INVENTOR(S) | : Timothy R. Miller et al. | |

It is certified that error appears in the above-identified patent and that said Letters Patent is hereby corrected as shown below:

In Column 25, Line(s) 12-13, Claim No. 30:
    Change "level of said incoming is adjusted to affect and increased suppression" to --level of said incoming signal is adjusted to affect an increased suppression--

Signed and Sealed this

Third Day of March, 2009

JOHN DOLL
*Acting Director of the United States Patent and Trademark Office*